(12) United States Patent
Denifl et al.

(10) Patent No.: US 10,253,115 B2
(45) Date of Patent: Apr. 9, 2019

(54) PROCESS FOR THE MANUFACTURE OF A CAPACITOR FILM

(75) Inventors: Peter Denifl, Helsinki (FI); Pirjo Jaaskelainen, Porvoo (FI); Timo Leinonen, Tolkkinen (FI); Bo Malm, Espoo (FI); Anders E. Nymark, Porvoo (FI); Torvald Vestberg, Porvoo (FI)

(73) Assignee: BOREALIS AG (AT)

( * ) Notice: Subject to any disclaimer, the term of this patent is extended or adjusted under 35 U.S.C. 154(b) by 419 days.

(21) Appl. No.: 14/240,696

(22) PCT Filed: Aug. 29, 2012

(86) PCT No.: PCT/EP2012/066729
§ 371 (c)(1),
(2), (4) Date: Apr. 7, 2014

(87) PCT Pub. No.: WO2013/030210
PCT Pub. Date: Mar. 7, 2013

(65) Prior Publication Data
US 2014/0220236 A1     Aug. 7, 2014

(30) Foreign Application Priority Data

Aug. 30, 2011  (EP) ..................................... 11179322

(51) Int. Cl.
*C08F 10/06*     (2006.01)
*C08J 5/18*      (2006.01)
(Continued)

(52) U.S. Cl.
CPC ............ *C08F 10/06* (2013.01); *C08F 110/06* (2013.01); *C08J 5/18* (2013.01); *H01G 4/14* (2013.01);
(Continued)

(58) Field of Classification Search
None
See application file for complete search history.

(56) References Cited

U.S. PATENT DOCUMENTS

| 4,469,648 A | 9/1984 | Ferraris et al. |
| 5,557,025 A | 9/1996 | Noristi et al. |
| (Continued) | | |

FOREIGN PATENT DOCUMENTS

| CN | 101213219 A | 7/2008 |
| CN | 101511587 A | 8/2009 |
| (Continued) | | |

OTHER PUBLICATIONS

First Korean Office Action dated Jun. 25, 2015.
(Continued)

*Primary Examiner* — Catherine S Branch
(74) *Attorney, Agent, or Firm* — Tarolli, Sundheim, Covell & Tummino LLP

(57) ABSTRACT

Process for producing of a capacitor film comprising the steps of (a) polymerizing propylene in the presence of a catalyst comprising a solid catalyst system obtaining a polypropylene, (b) subjecting said polypropylene to a film forming process obtaining a capacitor film, wherein during the polymerization step (a) said catalyst comprising the solid catalyst system fragments into nanosized catalyst fragments being distributed in said polypropylene, said solid catalyst system comprises a transition metal, a metal which is selected from one of the groups 1 to 3 of the periodic table (IUPAC), and an internal electron donor.

7 Claims, 2 Drawing Sheets

Figure 1:
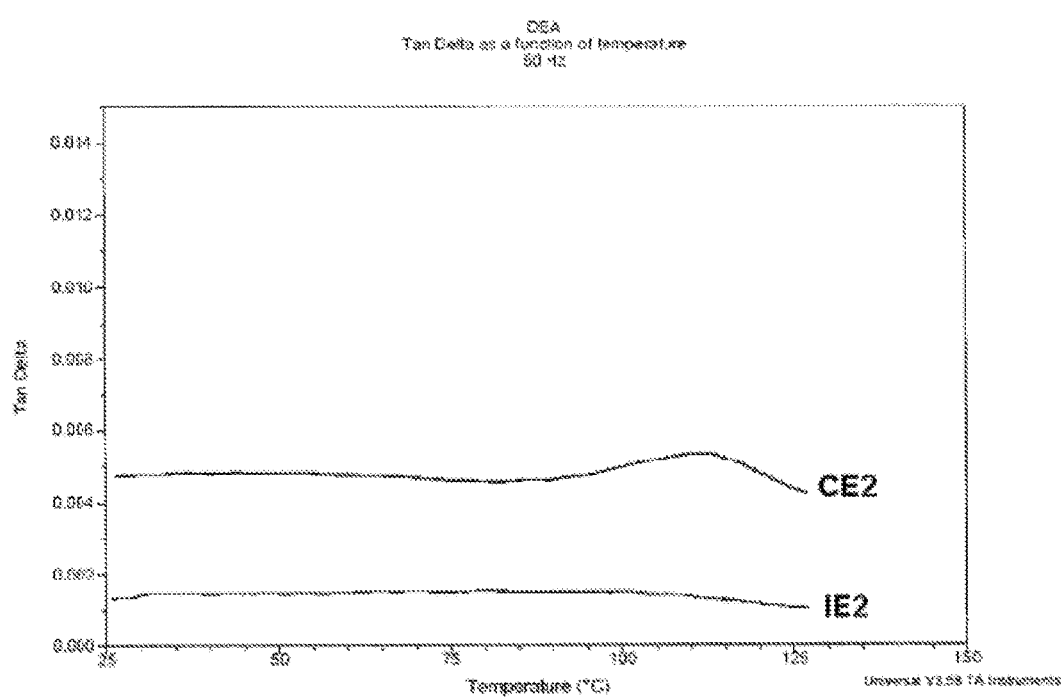

(51) Int. Cl.
*H01G 9/00* (2006.01)
*H01G 4/18* (2006.01)
*H01G 4/14* (2006.01)
*C08F 110/06* (2006.01)
*H01G 4/32* (2006.01)

(52) U.S. Cl.
CPC .............. *H01G 4/18* (2013.01); *H01G 4/186* (2013.01); *H01G 4/32* (2013.01); *H01G 9/0032* (2013.01); *C08J 2323/10* (2013.01); *C08J 2323/12* (2013.01)

(56) References Cited

U.S. PATENT DOCUMENTS

| | | | |
|---|---|---|---|
| 5,573,840 | A | 11/1996 | Inoue et al. |
| 6,094,337 | A | 7/2000 | Ueda et al. |
| 7,291,185 | B2 * | 11/2007 | Shiota ............... C23C 14/08 29/25.03 |
| 2010/0047544 | A1 * | 2/2010 | Busch ............... C08J 5/18 428/220 |
| 2010/0113716 | A1 * | 5/2010 | Leinonen ............ C08F 110/06 526/65 |
| 2010/0311924 | A1 * | 12/2010 | Denifl ............... C08F 10/02 526/90 |

FOREIGN PATENT DOCUMENTS

| | | |
|---|---|---|
| EP | 0575111 A2 | 12/1993 |
| EP | 1741725 A1 | 1/2007 |
| EP | 1826222 A1 | 8/2007 |
| EP | 1894715 A1 | 3/2008 |
| EP | 2383300 A1 | 11/2011 |
| JP | 6236709 | 8/1994 |
| JP | 11-240915 | 7/1999 |
| JP | 2010501712 | 1/2010 |
| KR | 100252418 B1 | 1/2000 |
| KR | 10-2007-0104895 A | 10/2007 |
| WO | 99/33843 A1 | 7/1999 |
| WO | 2004/029112 A1 | 4/2004 |
| WO | 2004/111098 A2 | 12/2004 |
| WO | 2006/069733 A1 | 7/2006 |
| WO | 2006/125672 A1 | 11/2006 |
| WO | 2007/006537 A1 | 1/2007 |
| WO | 2007077027 A1 | 7/2007 |
| WO | 2010087328 A1 | 8/2010 |
| WO | 2010/127997 A2 | 11/2010 |
| WO | 2010127997 A2 | 11/2010 |
| WO | 2011141380 A1 | 11/2011 |

OTHER PUBLICATIONS

Abboud et al., Journal of Applied Polymer Science 98, Study of the Morphology and Kinetics of Novel Ziegler-Natta Catalysts for Propylene Polymerization, 2005, pp. 2191-2199.
Rönkkö et al., Journal of Molecular Catalysis A: Chemical 309, Particle Growth and Fragmentation of Solid Self-Supported Ziegler-Natta-type Catalysts in Propylene Polymerization, 2009, pp 40-49.
1st Japanese Office Action dated Mar. 27, 2015.
Japanese Written Opinion dated Feb. 16, 2015.
First Chinese Office Action dated Aug. 6, 2015.
Cecchin et al., "On the mechanism of polypropylene growth over $MgCl_2/TiCl_4$/catalyst systems", Macromolecular Chemistry and Physics, vol. 202, 2001, pp. 1987-1994.
Noristi et al., "Investigation on the particle growth mechanism in propylene polymerization with $MgCl_2$-supported liegler-Natta catalysts", Journal of Polymer Science Part A: Polymer Chemistry, vol. 32, 1994, pp. 3047-3059.
Notice of Opposition for European Patent Application No. 11179322.0-1308/2565221.

\* cited by examiner

PROCESS FOR THE MANUFACTURE OF A CAPACITOR FILM

The present invention is directed to a new process for the manufacture of a capacitor film.

Polypropylene is the material of choice in the field of film capacitors as its chain lacks any kind of polar groups which orient under electrical field stress. As a result, polypropylene intrinsically possesses a low loss factor and high volume resistivity. These properties, combined with a relatively high dielectric constant and self healing character in the capacitor as well good mechanical properties, like high melting temperature and high stiffness, make polypropylene so valuable in this technical field. The dielectric strength or the breakdown voltage of polypropylene can be further increased in case it is biaxially oriented which is obtained by stretching a heated sheet of film in two opposing directions, longitudinal and transverse machine directions, inducing a more perfect crystalline formation and orientation. However in case a Ziegler-Natta catalyst has been employed during the manufacture of the polypropylene, typically the dielectric film made from such a polypropylene contains considerable amounts of polar residues, like chlorine, aluminium, titanium, magnesium or silicon originating from the used Ziegler-Natta catalyst. These residues decrease the resistivity, i.e. increase the conductivity of the polymers, making the polymer unsuitable to be used as such in applications, where very low conductivity is needed, like in films for capacitors. Accordingly to make polypropylene commercially attractive in this technical field it must be troublesome purified, typically washed in order to remove the undesired residues from the polymer material, a process which is time consuming and cost-intensive. Typically the purification of the polymer is carried out in an additional step after the last polymerisation step. Accordingly the polymer from the last polymerization step is conducted into a washing step, where the catalyst residues are dissolved out of the polymer material. Washing liquid typically used comprises organic hydrocarbon solvents having polar groups, like hydroxyl groups, e.g. propanol. Polypropylenes with low levels of impurities including metallic and non-metallic impurities, like aluminium, titanium, silicon, and halogen (such as Cl and F) are produced in the presence of supported single-site catalysts, as for instance described in WO 02/16455 A1. However, polymers disclosed in this application are to be washed in order to remove undesired impurities and residues.

Accordingly the object of the present invention is to provide a process which enables a skilled person to produce a capacitor film with desired electrical properties without the need to use a purified polypropylene, like a polypropylene which is washed in order to remove undesired residues as explained above The finding of the present invention is to use a polypropylene containing particles of small particle sizes, preferably of nano sizes. Especially it has been found that desired electrical properties are possible to achieve, if said small particles are distributed already during polymerization step instead of adding separately e.g. some nanoparticles to the ready polymers. Distribution of the small particles, preferably of nano sizes, already during polymerization, enables even distribution of the particles and thus desired electrical properties are achieved. Thus, according to the present invention it has been surprisingly found that by using during the polypropylene polymerization a catalyst system which breaks at a very early stage of polymerization in very small, nano-size particles the desired electrical properties are achieved. It has been surprisingly found that polymers produced by using a catalyst, which is able to break in said very small, nano-size particles, and which particles remain in the polymer, have interesting electrical properties and are thus suitable for use in producing capacitator films. In other words, the catalyst residues described herein do not deteriorate the electrical properties of the polymer, and thus, the amount of residues is not a critical issue. As a result of this, the costly and troublesome purifying step can be omitted. Thus, the amount of residues, typically measured by the ash content, is not a restrictive feature of the polymer and can be according to the invention be on the level as normally required for e.g. polymers for capacitor films, or it can be higher than normally accepted when conventional supported Ziegler-Natta catalysts are used for producing polymers for use in capacitor films.

Accordingly the present invention is directed in a first embodiment to a process for producing of a capacitor film comprising the steps of (a) polymerizing propylene and optionally ethylene and/or at least one $C_4$ to $C_{10}$ α-olefin in the presence of a catalyst comprising
  (a1) a solid catalyst system (SCS)
  (a2) optionally a cocatalyst, like an aluminum compound, and
  (a3) optionally an external donor, like an hydrocarbyloxy silane compound obtaining a polypropylene (PP),
(b) subjecting said polypropylene (PP) to a film forming process obtaining a capacitor film, wherein during the polymerization step (a) said catalyst comprising the solid catalyst system (SCS) fragments into nanosized catalyst fragments (F) being distributed, in said polypropylene (PP), said solid catalyst system (SCS) comprises (i) a compound of a transition metal which metal is preferably selected from one of the groups 4 to 6, in particular of group 4, like Ti, of the periodic table (IUPAC),
(ii) a compound of a metal which metal is selected from one of the groups 1 to 3 of the periodic table (IUPAC), and
(iii) an (internal) electron donor (E).

Said solid catalyst system (SCS) used in the process of the invention can further comprise (iv) solid catalytically inactive material the amount of which is less than 40.0 wt-%.

Preferably said solid catalyst system (SCS) used in the process of the invention (v) has a pore volume measured according ASTM 4641 of less than 1.40 ml/g,
and/or
(vi) has a surface area measured according to ASTM D 3663 of lower than 30 m²/g,
and/or
(vii) has a mean particle size (d50) in the range of 1 to 200 µm, preferably in the range of 10 to 150 µm.

Preferably, in case the solid catalyst system (SCS) comprises said solid catalytically inactive material, the solid catalyst system (SCS) comprises inclusions comprising or being composed of said catalytically inactive solid material in amounts of up to 30 wt.-%, more preferably up to 20 wt-%, still more preferably not more than 10 wt-%, based on the solid catalyst system (SCS).

Preferably the solid catalyst system (SCS) used in the invention is obtained by a process comprising contacting (c) a solution of a complex (C) of a metal which is selected from one of the groups 1 to 3 of the periodic table (IUPAC) and an electron donor (E), said complex (C) is obtained by reacting a compound (CM) of said metal with said electron donor (E) or a precursor (EP) thereof,
with
(d) a liquid transition metal compound (CT) or a solution of a transition metal compound (CT).

According to a second embodiment the present invention is directed to a process for producing of a capacitor film comprising the steps of
(a) polymerizing propylene and optionally ethylene and/or at least one $C_4$ to $C_{10}$ α-olefin in the presence of a catalyst comprising
  (a1) a solid catalyst system (SCS)
  (a2) optionally a cocatalyst, like an aluminum compound, and
  (a3) optionally an external donor, like an hydrocarbyloxy silane compound to produce a polypropylene (PP),
(b) subjecting said polypropylene (PP) to a film forming process obtaining thereby a capacitor film,
wherein said solid catalyst system (SCS) of step (a) is obtained by a process comprising contacting
(c) a solution of a complex (C) of a metal which is selected from one of the groups 1 to 3 of the periodic table (IUPAC) and an electron donor (E), said complex (C) is obtained by reacting a compound (CM) of said metal with said electron donor (E) or a precursor (EP) thereof,
with
(d) a liquid transition metal compound (CT) or a solution of a transition metal compound (CT).

Accordingly it is preferred that said solid catalyst system (SCS) comprises
(i) a compound of a transition metal which metal is preferably selected from one of the groups 4 to 6, in particular of group 4, like Ti, of the periodic table (IUPAC),
(ii) a compound of a metal which metal is selected from one of the groups 1 to 3 of the periodic table (IUPAC), and
(iii) an (internal) electron donor (E).

Said solid catalyst system (SCS) used in the process of the invention can further comprise
(iv) solid catalytically inactive material the amount of which is less than 40.0 wt-%.

Preferably said solid catalyst system (SCS) used in the process of the invention
(v) has a pore volume measured according ASTM 4641 of less than 1.40 ml/g,
and/or
(vi) has a surface area measured according to ASTM D 3663 of lower than 30 m²/g,
and/or
(vii) has a mean particle size (d50) in the range of 1 to 200 μm, preferably in the range of 10 to 150 μm.

Preferably, in case the solid catalyst system (SCS) comprises said solid catalytically inactive material, the solid catalyst system (SCS) comprises inclusions comprising or being composed of said solid material in amounts of up to 30 wt.-%, more preferably up to 20 wt-%, still more preferably not more than 10 wt-%, based on the solid catalyst system (SCS).

Preferably the catalyst comprising the solid catalyst system (SCS) is distributed in the polypropylene (PP) as nanosized catalyst fragments (F). The distribution of the nanosized catalyst fragments (F) occurs due to fragmentation of the catalyst and of the solid catalyst system (SCS), respectively, at a very early stage of the polymerization process in step (a). This early fragmentation enables even distribution of fragments in the polymer.

The polypropylene (PP) of the first and second embodiment is preferably a random propylene copolymer (R-PP) or a propylene homopolymer (H-PP), the latter especially preferred.

Preferably the polypropylene (PP) of the first and second embodiment
(a) has a breakdown voltage at 100° C. of at least 350 AC/μm measured on a biaxially oriented polypropylene (BOPP) film made from said polypropylene (PP) at a draw ratio in machine direction and in transverse direction of 4.5×9.5,
and/or
(b) fulfils the equation $$\frac{(P75 - P110)}{P75} \times 100 \le 6.0$$

wherein
P75 is the permittivity measured at 50 Hz and 75° C.;
P110 is the permittivity measured at 50 Hz and 110° C.;
and/or
(c) fulfils the equation $$\frac{(D75 - D110)}{D75} \times 100 \ge -10.0$$

wherein
D75 is the dissipation (tan delta) measured at 50 Hz and 75° C.;
D110 is the dissipation (tan delta) measured at 50 Hz and 110° C.;
and/or
(d) <2,1> erythro regiodefects of equal or below 0.4 mol.-% determined by $^{13}$C-NMR spectroscopy.

Thus, alternatively the inventive process can be defined by a third embodiment as a process for producing of a capacitor film comprising the step of subjecting a polypropylene (PP) with <2,1> erythro regiodefects of equal or below 0.4 mol.-% determined by $^{13}$C-NMR spectroscopy to a film forming process, wherein additionally said polypropylene (PP)
(a) has a breakdown voltage at 100° C. of at least 350 AC/μm measured on a biaxially oriented polypropylene (BOPP) film made from said polypropylene (PP) at a draw ratio in machine direction and in transverse direction of 4.5×9.5,
and/or
(b) fulfils the equation $$\frac{(P75 - P110)}{P75} \times 100 \le 6.0$$

wherein
P75 is the permittivity measured at 50 Hz and 75° C.;
P110 is the permittivity measured at 50 Hz and 110° C.;
and/or
(c) fulfils the equation $$\frac{(D75 - D110)}{D75} \times 100 \ge -10.0$$

wherein
D75 is the dissipation (tan delta) measured at 50 Hz and 75° C.;
D110 is the dissipation (tan delta) measured at 50 Hz and 110° C.

The polypropylene (PP) of the third embodiment is preferably a random propylene copolymer (R-PP) or a propylene homopolymer (H-PP), the latter especially preferred.

Preferably the polypropylene (PP) comprises nano-sized catalyst fragments (F) being distributed in said polypropylene (PP).

Preferably the nanosized catalyst fragments (F) originate from a catalyst and a solid catalyst system (SCS), respectively. Said catalyst and said solid catalyst system (SCS), respectively, fragments at a very early stage of the polypropylene (PP) polymerization into the nanosized catalyst fragments (F) being distributed in the polypropylene (PP).

Accordingly it is preferred that prior to the film forming process of the third embodiment propylene and optionally ethylene and/or at least one $C_4$ to $C_{10}$ α-olefin is polymerized in the presence of a catalyst comprising
(a) a solid catalyst system (SCS),
(b) optionally a cocatalyst, like an aluminum compound, and
(c) optionally an external donor, like an hydrocarbyloxy silane compound
to produce the polypropylene (PP), wherein said solid catalyst system (SCS) preferably comprises
(i) a compound of a transition metal which metal is preferably selected from one of the groups 4 to 6, in particular of group 4, like Ti, of the periodic table (IUPAC), and
(ii) a compound of a metal which metal is selected from one of the groups 1 to 3 of the periodic table (IUPAC),
(iii) an (internal) electron donor (E).

Said solid catalyst system (SCS) used in the process of the invention can further comprise
(iv) solid catalytically inactive material the amount of which is less than 40.0 wt-%.

Preferably said solid catalyst system (SCS) used in the process of the invention
(v) has a pore volume measured according ASTM 4641 of less than 1.40 ml/g,
and/or
(vi) has a surface area measured according to ASTM D 3663 of lower than 30 m²/g,
and/or
(vii) has a mean particle size (d50) in the range of 1 to 200 μm, preferably in the range of 10 to 150 μm.

Preferably, in case the solid catalyst system (SCS) comprises said solid catalytically inactive material, the solid catalyst system (SCS) comprises inclusions comprising or being composed of said solid material in amounts of up to 30 wt-% more preferably up to 20 wt-%, still more preferably not more than 10 wt-%, based on the solid catalyst system (SCS).

Preferably the solid catalyst system (SCS) of the third embodiment is obtained by a process comprising contacting
(c) a solution of a complex (C) of a metal which is selected from one of the groups 1 to 3 of the periodic table (IUPAC) and an electron donor (E), said complex (C) is obtained by reacting a compound (CM) of said metal with said electron donor (E) or a precursor (EP) thereof, with
(d) a liquid transition metal compound (CT) or a solution of a transition metal compound (CT).

Finally the present invention is also directed to a polypropylene (PP) having <2,1> erythro regiodefects of equal or below 0.4 mol.-% determined by $^{13}$C-NMR spectroscopy and is further characterized by (a) a breakdown voltage at 100° C. of at least 350 AC/μm measured on a biaxially oriented polypropylene (BOPP) film made from said polypropylene (PP) at a draw ratio in machine direction and in transverse direction of 4.5×9.5,
and/or
(b) the equation $$\frac{(P75 - P110)}{P75} \times 100 \leq 6.0$$

wherein
P75 is the permittivity measured at 50 Hz and 75° C.;
P110 is the permittivity measured at 50 Hz and 110° C.;
and/or
(c) the equation $$\frac{(D75 - D110)}{D75} \times 100 \geq -10.0$$

wherein
D75 is the dissipation (tan delta) measured at 50 Hz and 75° C.;
D110 is the dissipation (tan delta) measured at 50 Hz and 110° C.

Additionally the present invention is directed to a capacitor film comprising a polypropylene (PP) with <2,1> erythro regiodefects of equal or below 0.4 mol.-% determined by $^{13}$C-NMR spectroscopy, wherein further the polypropylene (PP) and/or the capacitor film
(a) has/have a breakdown voltage at 100° C. of at least 350 AC/μm measured on a biaxially oriented polypropylene (BOPP) film made from said polypropylene (PP) at a draw ratio in machine direction and in transverse direction of 4.5×9.5,
and/or
(b) fulfil(s) the equation $$\frac{(P75 - P110)}{P75} \times 100 \leq 6.0$$

wherein
P75 is the permittivity measured at 50 Hz and 75° C.;
P110 is the permittivity measured at 50 Hz and 110° C.;
and/or
(c) fulfil(s) the equation $$\frac{(D75 - D110)}{D75} \times 100 \geq -10.0$$

wherein
D75 is the dissipation (tan delta) measured at 50 Hz and 75° C.;
D110 is the dissipation (tan delta) measured at 50 Hz and 110° C.

In a preferred embodiment the present invention is directed to a capacitor film as defined above wherein the polypropylene is the only polymer component of said capacitor film It has been surprisingly found out that the capacitor films according to the invention have good electrical properties even though the films might contain even considerable amounts of residues indication of which is the higher ash content as normally allowed in products having good electrical properties. Without bound to any theories, it is believed that the ash contained in the polymer prepared as described here differs from the ones originating from conventionally supported Ziegler-Natta catalysts.

Thus, according to one aspect the present invention is related to the use of a specific type of catalyst system for producing propylene polymer suitable to be used as capacitator film (or having electrical properties suitable for use in capacitator film applications) and to be used as such, i.e. without any need to remove the catalyst residues out of the polymer, i.e. without any purification, like washing step.

In the following the embodiments described above will be discussed together.

First the polypropylene (PP) used for the preparation of the capacitor film as well as the capacitor film will be described in more detail. Subsequently the processes applied for the preparation of the polypropylene and the capacitor film, respectively, will be described in detail.

Polypropylene (PP)

Essential aspect of the present invention is that a specific polypropylene (PP) is used for the manufacture of the capacitor film.

The polypropylene (PP) is featured by a rather low comonomer content. Accordingly it is preferred that the capacitor film and/or the polypropylene (PP) has/have a comonomer content of equal or below 2.0 wt.-%, more preferably equal or below 1.5 wt.-%, yet more preferably equal or below 1.0 wt.-% or most preferable less than 0.5 wt-%

Thus the polypropylene (PP) is preferably a random propylene copolymer (R-PP) or a propylene homopolymer (H-PP), the latter is especially preferred.

In case the polypropylene is a random propylene copolymer (R-PP) it comprises monomers copolymerizable with propylene, for example comonomers such as ethylene and/or $C_4$ to $C_{20}$ α-olefins, in particular ethylene and/or $C_4$ to $C_{10}$ α-olefins, e.g. 1-butene and/or 1-hexene. Preferably the random propylene copolymer (R-PP) comprises, especially consists of, monomers copolymerizable with propylene selected from the group consisting of ethylene, 1-butene and 1-hexene. More specifically the random propylene copolymer (R-PP) comprises—apart from propylene—units derivable from ethylene and/or 1-butene. In a preferred embodiment the random propylene copolymer (R-PP) comprises units derivable from ethylene and propylene only. The comonomer content in the random propylene copolymer (R-PP) is preferably in the range of more than 0.5 to 2.0 wt.-%, still more preferably in the range of more than 0.5 to 1.0 wt.-%, yet more preferably in the range of more than 0.5 to 0.8 wt.-%.

The expression homopolymer used in the instant invention relates to a polypropylene (PP) that consists substantially, i.e. of equal or more than 99.5 wt.-%, more preferably of equal or more than 99.8 wt.-%, of propylene units. In a preferred embodiment only propylene units in the propylene homopolymer (H-PP) are detectable.

Preferably the polypropylene (PP) is isotactic. Accordingly it is appreciated that the polypropylene (PP) has a rather high pentad concentration (mmmm %) i.e. higher than 90%, more preferably higher than 92%, still more preferably higher than 93% and even higher than 95%, like at least 97% are possible.

A further characteristic of the capacitor film and/or the polypropylene (PP) is the low amount of misinsertions of propylene within the polymer chain, which indicates that the polypropylene (PP) is produced in the presence of a catalyst as defined below, i.e. in the presence of a Ziegler-Natta catalyst. Accordingly the capacitor film and/or the polypropylene (PP) is/are preferably featured by low amount of <2,1> regiodefects, i.e. of equal or below 0.4 mol.-%, more preferably of equal or below than 0.2 mol.-%, like of not more than 0.1 mol.-%, determined by $^{13}$C-NMR spectroscopy. In an especially preferred embodiment no <2,1> regiodefects are detectable, i.e. the amount of <2,1> regiodefects is 0.0 mol.-%.

The capacitor film and/or the polypropylene can have a xylene cold soluble content (XCS) in a broad range, i.e. up to 6.0 wt.-%. Accordingly the capacitor film and/or the polypropylene (PP) may have a xylene cold soluble content (XCS) in the range of 0.3 to 6.0 wt.-%, more preferably 0.5 to 5.5 wt.-%, still more preferably 1.0 to 4.0 wt.-%.

The amount of xylene cold soluble (XCS) additionally indicates that the capacitor film and/or the polypropylene (PP) is/are preferably free of any elastomeric polymer component, like an ethylene propylene rubber. In other words the capacitor film and/or the polypropylene (PP) shall be not a heterophasic polypropylene, i.e. a system consisting of a polypropylene matrix in which an elastomeric phase is dispersed. Such systems are featured by a rather high xylene cold soluble content.

A further aspect of the instant invention is that the capacitor film and/or polypropylene (PP) has/have a rather high melting point. Accordingly it is appreciated that the capacitor film and/or the polypropylene (PP) according to this invention has/have a melting temperature ($T_m$) determined by differential scanning calorimetry (DSC) of at least 155° C., more preferably of at least 158° C., yet more preferably of at least 160° C. Thus it is in particular appreciated that the melting temperature ($T_m$) determined by differential scanning calorimetry (DSC) of the capacitor film and/or of the polypropylene is in the range of 155 to 168° C., more preferably in the range of 155 to 165° C., still more preferably in the range of 157 to 163° C., like in the range of 159 to 163° C.

Additionally it is appreciated that the capacitor film and/or the polypropylene (PP) has/have a rather high crystallization temperature ($T_c$). Thus it is preferred that the capacitor film and/or the polypropylene (PP) has/have crystallization temperature ($T_c$) determined by differential scanning calorimetry (DSC) of at least 110° C., more preferably of at least 111° C. Accordingly the capacitor film and/or the polypropylene (PP) has/have preferably a crystallization temperature ($T_c$) determined by differential scanning calorimetry (DSC) in the range of 110 to 120° C., more preferably in the range of 110 to 118° C.

Further it is preferred that the polypropylene (PP) has a weight average molecular weight ($M_w$) from 200,000 to 600,000 g/mol, more preferably from 200 000 to 450 000 g/mol.

A broad molecular weight distribution (MWD) improves the processability of the polypropylene. Accordingly it is appreciated that the molecular weight distribution (MWD) of the capacitor film and/or the polypropylene (PP) is at least 2.8, more preferably at least 3.0, like at least 3.3 In a preferred embodiment the molecular weight distribution (MWD) is preferably between 3.0 to 10.0, still more preferably in the range of 3.5 to 8.0.

Furthermore, it is preferred that the capacitor film and/or the polypropylene (PP) has/have a melt flow rate $MFR_2$ (230° C.) of more than 0.5 g/10 min, more preferably of more than 1.0 g/10 min. Accordingly it is appreciated that the melt flow rate $MFR_2$ (230° C.) is in the range of 0.5 to 8.0 g/10 min, more preferably in the range of 1.0 to 6.0 g/10 min, still more preferably in the range of 1.5 to 4.0 g/10 min.

Further it is appreciated that the polypropylene (PP) is of linear structure and thus does not show (or nearly does not show) a kind of branching. Accordingly it is appreciated that the capacitor film and/or the polypropylene (PP) has/have preferably a branching index g' of not less than 0.9, preferably more than 0.9, like at least 0.95. In other words if the capacitor film and/or the polypropylene (PP) has/have some kind of branching it shall be rather moderate. Accordingly the branching index g' of the capacitor film and/or the polypropylene (PP) is preferably in the range of 0.9 to 1.0, more preferably in the range of more than 0.9 to 1.0, like in the range of 0.96 to 1.0. In an especially preferred embodiment the capacitor film and/or the polypropylene (PP) shows/show no branching, i.e. the capacitor film and/or the polypropylene has/have a branching index g' of 1.0.

The polypropylene (PP) of the present invention is preferably featured by the presence of unique catalyst residues. More precisely the polypropylene (PP) is preferably characterized by catalyst fragments (F) being of nanosized range. These fragments (F) preferably originate from a catalyst comprising a solid catalyst system (SCS) used for the manufacture of the polypropylene (PP). The used process for the manufacture of the polypropylene (PP) including the specific catalyst comprising the solid catalyst system (SCS) is defined in more detail below.

The term "nanosized" according to this invention indicates that the catalyst fragments (F) have a mean particle size d50 of below 1 μm, more preferably of below 800 nm, still more preferably 20 to 600 nm, yet more preferably 30 to 500 nm, like 30 to 300 nm.

The expression "even distribution" (or similar terms like "evenly distributed") of the nanosized catalyst fragments (F) in the polypropylene (PP) shall indicate that the fragments (F) are not localized in one specific area of the polypropylene (PP) but anywhere in the polypropylene (PP). This expression shall in particular indicates that the fragments (F) originate from a catalyst comprising the solid catalyst system (SCS) which breaks at very early stage of polymerization of the polypropylene (PP) in very small, nano-size particles and thus are evenly distributed in the growing polypropylene (PP). Such an even distribution cannot be accomplished by adding separately nano-size particles after polymerization to the polypropylene (PP). In other words the even distribution of the nanosized (catalyst) fragments (F) in the polypropylene (PP) can only be accomplished by using the catalyst comprising the solid catalyst system (SCS) as disclosed herein, which breaks apart at the very early stage of the polymerization process of the polypropylene (PP).

It has been surprisingly found that the polypropylene (PP) containing nanosized catalyst fragments (F), which originate from the catalyst comprising solid catalyst system (SCS), have interesting electrical properties, i.e. low electrical conductivity. In other words, the nanosized catalyst fragments (F) described herein do not deteriorate the electrical properties of the polypropylene (PP), and thus, the amount of fragments is not a critical issue. To the contrary it seems that the specific nanosized catalyst fragments (F) are useful to lower electrical conductivity compared to conventional catalyst residues. As a result of this, a costly and troublesome purifying step can be omitted.

An indicator of the amount of residues, i.e. catalyst fragments (F), in capacitor film and/or in the polypropylene (PP) is the ash content. Normally the ash content of a polypropylene in the field of capacitors must be rather low in order to avoid deterioration in electrical properties.

Thus typically the polymer used for capacitor film should have the ash content below 30 ppm, preferably below 20 ppm (ISO 3451-1). However, as described above, the amount of ash is not any restrictive feature in the polypropylene (PP) used in the instant invention, i.e. it has been found that even if the ash content would be higher than normally accepted, the electrical properties are not deteriorated, which indicates that the residues are not of size and type, which would harm the desired properties, but are of very small size (nano-size) and further evenly distributed in the polymer. Thus, surprisingly, although the polypropylene (PP) has a high ash content good electrical properties are achieved. Accordingly, the capacitor film and/or the polypropylene (PP) of the invention can have an ash content of from very small, like below 30 ppm up to several hundreds of ppm, like up to 500 ppm. In other words the capacitor film and/or the polypropylene (PP) may contain 5 to 500 ppm ash content, preferably 10 to 400 ppm. In another embodiment the ash content is more than 30 to 500 ppm, more preferably in the range of 40 to 400 ppm, like in the range of 50 to 300 ppm.

Normally with such high ash content the electrical properties of a polypropylene are unsatisfactorily, which however is not the case for the capacitor film and/or the polypropylene (PP) of the instant invention.

Accordingly it is appreciated that the polypropylene (PP) is featured by
(a) an breakdown voltage at 100° C. of equal or more than 350 AC/μm, more preferably of equal or more than 380 AC/μm,
and/or
(b) a field strength at breakdown being at least 550 VDC/μm, measured on a biaxially oriented polypropylene (BOPP) film of thickness of 6.5 to 7 μm made from said polypropylene (PP) at a draw ratio in machine direction and in transverse direction of 4.5×9.5.

It is known that the permittivity and the dissipation factor are dependent from the temperature, wherein a pronounced influence can be observed at elevated temperatures. With respect to polypropylene a pronounced influence can be observed at temperatures above 75° C., in particular at temperatures above 100° C.

However, in contrast to polypropylene according the state of the art the influence on the permittivity and the dissipation factor at elevated temperatures is less pronounced in polypropylene according to the present invention. Accordingly the polypropylene (PP) of the instant invention can be characterised by its permittivity and/or dissipation factor (tan delta). Therefore it is preferred that the polypropylene (PP) of the instant invention fulfils preferably the equation $\frac{(P75 - P110)}{P75} \times 100 \leq 6.0;$ (a1)

more preferably the equation $1.0 \leq \frac{(P75 - P110)}{P75} \times 100 \leq 5.0;$ still more preferably the equation $1.5 \leq \frac{(P75 - P110)}{P75} \times 100 \leq 4.5;$ yet more preferably the equation $2.0 \leq \frac{(P75 - P110)}{P75} \times 100 \leq 4.0;$ wherein
P75 is the permittivity measured at 50 Hz and 75° C.;
P110 is the permittivity measured at 50 Hz and 110° C.;
and/or preferably the equation
$$\frac{(P75 - P120)}{P75} \times 100 \leq 12.0; \quad (a2)$$

more preferably the equation
$$2.0 \leq \frac{(P75 - P120)}{P75} \times 100 \leq 11.0;$$

still more preferably the equation
$$3.0 \leq \frac{(P75 - P120)}{P75} \times 100 \leq 9.0;$$

yet more preferably the equation
$$4.0 \leq \frac{(P75 - P120)}{P75} \times 100 \leq 8.0;$$

wherein
P75 is the permittivity measured at 50 Hz and 75° C.;
P120 is the permittivity measured at 50 Hz and 120° C.;
and/or preferably the equation
$$\frac{(D75 - D110)}{D75} \times 100 \geq -10.0 \quad (b1)$$

more preferably the equation
$$20.0 \geq \frac{(D75 - D110)}{D75} \times 100 \geq -5.0$$

still more preferably the equation
$$15.0 \geq \frac{(D75 - D110)}{D75} \times 100 \geq 0.0$$

yet more preferably the equation
$$10.0 \geq \frac{(D75 - D110)}{D75} \times 100 \geq 2.0$$

wherein
D75 is the dissipation (tan delta) measured at 50 Hz and 75° C.;
D110 is the dissipation (tan delta) measured at 50 Hz and 110° C.
and/or preferably the equation
$$\frac{(D75 - D120)}{D75} \times 100 \geq 10.0 \quad (b2)$$

more preferably the equation
$$50.0 \geq \frac{(D75 - D120)}{D75} \times 100 \geq 12.0$$

still more preferably the equation
$$40.0 \geq \frac{(D75 - D120)}{D75} \times 100 \geq 15.0$$

yet more preferably the equation
$$30.0 \geq \frac{(D75 - D120)}{D75} \times 100 \geq 20.0$$

wherein
D75 is the dissipation (tan delta) measured at 50 Hz and 75° C.;
D120 is the dissipation (tan delta) measured at 50 Hz and 120° C.

The same electrical performance is desirable for the capacitor film comprising the polypropylene (PP). Accordingly the instant capacitor film comprising the polypropylene (PP) is featured by
(a) an breakdown voltage at 100° C. of equal or more than 350 AC/μm, more preferably of equal or more than 380 AC/μm,
and/or
(b) a field strength at breakdown being at least 550 VDC/μm, measured on a biaxially oriented polypropylene (BOPP) film of thickness of 6.5 to 7 μm made from said polypropylene (PP) at a draw ratio in machine direction and in transverse direction of 4.5×9.5.

Additionally or alternatively to the previous paragraph the instant capacitor film comprising the polypropylene (PP) fulfils preferably the equation
$$\frac{(P75 - P110)}{P75} \times 100 \leq 6.0; \quad (a1)$$

more preferably the equation
$$1.0 \leq \frac{(P75 - P110)}{P75} \times 100 \leq 5.0;$$

still more preferably the equation
$$1.5 \leq \frac{(P75 - P110)}{P75} \times 100 \leq 4.5;$$

yet more preferably the equation
$$2.0 \leq \frac{(P75 - P110)}{P75} \times 100 \leq 4.0;$$

wherein
P75 is the permittivity measured at 50 Hz and 75° C.;
P110 is the permittivity measured at 50 Hz and 110° C.;
and/or preferably the equation
$$\frac{(P75 - P120)}{P75} \times 100 \leq 12.0; \quad (a2)$$

more preferably the equation
$$2.0 \leq \frac{(P75 - P120)}{P75} \times 100 \leq 11.0;$$

still more preferably the equation
$$3.0 \leq \frac{(P75 - P120)}{P75} \times 100 \leq 9.0;$$

yet more preferably the equation
$$4.0 \leq \frac{(P75 - P120)}{P75} \times 100 \leq 8.0;$$

wherein
P75 is the permittivity measured at 50 Hz and 75° C.;
P120 is the permittivity measured at 50 Hz and 120° C.;
and/or preferably the equation
$$\frac{(D75 - D110)}{D75} \times 100 \geq -10.0 \quad (b1)$$

more preferably the equation
$$20.0 \geq \frac{(D75 - D110)}{D75} \times 100 \geq -5.0$$

still more preferably the equation
$$15.0 \geq \frac{(D75 - D110)}{D75} \times 100 \geq 0.0$$

-continued yet more preferably the equation $10.0 \geq \frac{(D75 - D110)}{D75} \times 100 \geq 2.0$ wherein
D75 is the dissipation (tan delta) measured at 50 Hz and 75° C.;
D110 is the dissipation (tan delta) measured at 50 Hz and 110° C.
and/or preferably the equation $\frac{(D75 - D120)}{D75} \times 100 \geq 10.0$ (b2)

more preferably the equation $50.0 \geq \frac{(D75 - D120)}{D75} \times 100 \geq 12.0$ still more preferably the equation $40.0 \geq \frac{(D75 - D120)}{D75} \times 100 \geq 15.0$ yet more preferably the equation $30.0 \geq \frac{(D75 - D120)}{D75} \times 100 \geq 20.0$ wherein
D75 is the dissipation (tan delta) measured at 50 Hz and 75° C.;
D120 is the dissipation (tan delta) measured at 50 Hz and 120° C.

In a preferred embodiment the present invention is directed to a capacitor film as defined above wherein the polypropylene (PP) is the only polymer component of said capacitor film Further it is appreciated that the capacitor film and/or the polypropylene (PP) is/are featured by an electrical conductivity of 70 fS/m or less, more preferably of <0.01 (lower values not detectable by the DC conductivity measurement) to 60 fS/m, more preferably of <0.01 to 40 fS/m, more preferably of <0.01 to 30 fS/m, still more preferably of <0.01 to 20 fS/m, still yet more preferably <0.01 to 10 fS/m when measured according to DC conductivity method ASTM D257 as described in the "Example Section".

Considering the above the present invention is especially directed to polypropylene (PP) being propylene homopolymer (H-PP), wherein said propylene homopolymer (H-PP) has <2,1> regiodefects in an amount of equal or below 0.4 mol.-%, preferably of equal or below than 0.2 mol.-%, more preferably of not more than 0.1 mol.-%, yet more preferably are not detectable, determined by $^{13}$C-NMR spectroscopy, wherein further said propylene homopolymer (H-PP) fulfils the equation $\frac{(P75 - P110)}{P75} \times 100 \leq 6.0$;

preferably the equation $1.0 \leq \frac{(P75 - P110)}{P75} \times 100 \leq 5.0$;

more preferably the equation $1.5 \leq \frac{(P75 - P110)}{P75} \times 100 \leq 4.5$;

still more preferably the equation $2.0 \leq \frac{(P75 - P110)}{P75} \times 100 \leq 4.0$;

wherein
P75 is the permittivity measured at 50 Hz and 75° C.;
P110 is the permittivity measured at 50 Hz and 110° C.;
Furthermore, it is preferred that the propylene homopolymer (H-PP) of the previous paragraph fulfils preferably the equation $\frac{(P75 - P120)}{P75} \times 100 \leq 12.0$; (a)

more preferably the equation $2.0 \leq \frac{(P75 - P120)}{P75} \times 100 \leq 11.0$;

still more preferably the equation $3.0 \leq \frac{(P75 - P120)}{P75} \times 100 \leq 9.0$;

yet more preferably the equation $4.0 \leq \frac{(P75 - P120)}{P75} \times 100 \leq 8.0$;

wherein
P75 is the permittivity measured at 50 Hz and 75° C.;
P120 is the permittivity measured at 50 Hz and 120° C.;
and/or preferably the equation $\frac{(D75 - D110)}{D75} \times 100 \geq -10.0$ (b1)

more preferably the equation $20.0 \geq \frac{(D75 - D110)}{D75} \times 100 \geq -5.0$ still more preferably the equation $15.0 \geq \frac{(D75 - D110)}{D75} \times 100 \geq 0.0$ yet more preferably the equation $10.0 \geq \frac{(D75 - D110)}{D75} \times 100 \geq 2.0$ wherein
D75 is the dissipation (tan delta) measured at 50 Hz and 75° C.;
D110 is the dissipation (tan delta) measured at 50 Hz and 110° C.
and/or preferably the equation $\frac{(D75 - D120)}{D75} \times 100 \geq 10.0$ (b2)

more preferably the equation $50.0 \geq \frac{(D75 - D120)}{D75} \times 100 \geq 12.0$ still more preferably the equation $40.0 \geq \frac{(D75 - D120)}{D75} \times 100 \geq 15.0$ -continued yet more preferably the equation $30.0 \geq \frac{(D75 - D120)}{D75} \times 100 \geq 20.0$ wherein D75 is the dissipation (tan delta) measured at 50 Hz and 75° C.;

D120 is the dissipation (tan delta) measured at 50 Hz and 120° C.

Additionally the propylene homopolymer (H-PP) as defined in the two previous paragraphs preferably (a) has an ash content of below 5 ppm up to to 500 ppm, more preferably of 10 to 400 ppm, still more preferably of 30 to 500 ppm, yeti more preferably of 40 to 400 ppm, like of 50 to 300 ppm;

and/or (b) contains nanosized catalyst fragments (F) with a mean particle size d50 of below 1 µm, more preferably of below 800 nm, still more preferably of 20 to 600 nm, yet more preferably of 30 to 500 nm, like of 30 to 300 nm;

and/or (c) has a melting temperature ($T_m$) of at least 155° C., more preferably of at least 158° C., still more preferably of at least 160° C., yet more preferably in the range of 155 to 168° C., still yet more preferably in the range of 155 to 165° C., like in the range of 157 to 163° C. or like in the range of 159 to 163° C.;

and/or (d) has crystallization temperature ($T_c$) of at least 110° C., more preferably of at least 111° C., still more preferably in the range of 110 to 120° C., yet more preferably in the range of 110 to 118° C.

Finally the propylene homopolymer (H-PP) may be additionally featured by (a) an breakdown voltage at 100° C. of equal or more than 350 AC/µm, more preferably of equal or more than 380 AC/µm, and/or (b) a field strength at breakdown being at least 550 VDC/µm, measured on a biaxially oriented polypropylene (BOPP) film of thickness of 6.5 to 7 µm made from said polypropylene (PP) at a draw ratio in machine direction and in transverse direction of 4.5×9.5.

Capacitor Film

The polypropylene (PP) as defined above is subjected to a film forming process obtaining thereby a capacitor film. Preferably the polypropylene (PP) is the only polymer within the capacitor film. Accordingly the capacitor film may contain additives but preferably no other polymer. Thus the remaining part up to 100.0 wt-% may be accomplished by additives known in the art, like antioxidants. However this remaining part shall be not more than 5.0 wt.-%, preferably not more than 2.0 wt.-%, like not more than 1.0 wt. %, within the capacitor film. Accordingly the capacitor film preferably comprises more than 95 wt.-%, more preferably more 98 wt.-%, like more than 99.0 wt.-%, of the polypropylene (PP) as defined herein.

The thickness of the capacitor film can be up to 20.0 µm, preferably up to 15.0 µm, however, typically the capacitor film has a thickness of not more than 12.0 µm, preferably not more than 10.0 µm, more preferably not more than 8.0 µm, yet more preferably in the range of 2.0 to 10 µm, yet more preferably in the range of 2.5 to 10.0 µm like in the range of 3.0 to 8.0 µm.

Further it is preferred that the capacitor film is a biaxially oriented film, i.e. the polypropylene (PP) as defined above or any mixtures (blends) comprising the polypropylene (PP) has/have been subjected to a drawing process obtaining thereby a biaxially oriented polymer. As indicated above the capacitor film preferably contains the polypropylene (PP) as only polymer and thus it is preferably a biaxially oriented polypropylene (BOPP) made from said polypropylene (PP).

Preferably the capacitor film, i.e. the biaxially oriented polypropylene (BOPP), has a draw ratio in machine direction of at least 3.0 and a draw ratio in transverse direction of at least 3.0. Such ratios are appreciated as commercial biaxially oriented polypropylene films must be stretchable at least to the above defined extent without breaking. The length of the sample increases during stretching in longitudinal direction and the draw ratio in longitudinal direction calculates from the ratio of current length over original sample length. Subsequently, the sample is stretched in transverse direction where the width of the sample is increasing. Hence, the draw ratio calculates from the current width of the sample over the original width of the sample. Preferably the draw ratio in machine direction of the capacitor film, i.e. the biaxially oriented polypropylene (BOPP), ranges from 3.5 to 8.0, more preferably from 4.5 to 6.5. The draw ratio in transverse direction of the capacitor film, i.e. the biaxially polypropylene (BOPP), ranges preferably from 4.0 to 15.0, like in the range of 5.0 to 10.0, more preferably from 6.0 to 10.0. Temperature range during stretching is in general 100° C. to 180° C.

As the capacitor film, i.e. the biaxially oriented polypropylene (BOPP), preferably is produced from the polypropylene (PP) as defined above, the properties given for the polypropylene (PP) are equally applicable for the capacitor film if not specified differently.

The present invention is not only directed to a process for the manufacture of a capacitor film but also to the capacitor film comprising the polypropylene (PP). Thus all information provided in the section polypropylene (PP) and capacitor film are also regarded as product related features. Accordingly the present invention is in particular directed to a capacitor film as defined in the claims.

In other words the present invention is also directed to a capacitor film comprising polypropylene (PP), in particular to a capacitor film comprising propylene homopolymer (H-PP), wherein further the capacitor film and/or the propylene (PP), in particular the capacitor film and/or propylene homopolymer (H-PP) fulfil(s)

the equation $\frac{(P75 - P110)}{P75} \times 100 \leq 6.0$;

preferably the equation $1.0 \leq \frac{(P75 - P110)}{P75} \times 100 \leq 5.0$;

more preferably the equation $1.5 \leq \frac{(P75 - P110)}{P75} \times 100 \leq 4.5$;

still more preferably the equation $2.0 \leq \frac{(P75 - P110)}{P75} \times 100 \leq 4.0$;

wherein

P75 is the permittivity measured at 50 Hz and 75° C.;

P110 is the permittivity measured at 50 Hz and 110° C.;

In a preferred embodiment the present invention is directed to a capacitor film as defined above wherein the polypropylene homopolymer (H-PP) is the only polymer component of said capacitor film Concerning of the preferred structural properties of said capacitor film reference is made to the information provided above.

Additionally the capacitor film and/or the propylene homopolymer (H-PP) of the previous two paragraphs fulfil(s) further preferably the equation
$$\frac{(P75 - P120)}{P75} \times 100 \leq 12.0; \quad (a)$$

more preferably the equation
$$2.0 \leq \frac{(P75 - P120)}{P75} \times 100 \leq 11.0;$$

still more preferably the equation
$$3.0 \leq \frac{(P75 - P120)}{P75} \times 100 \leq 9.0;$$

yet more preferably the equation
$$4.0 \leq \frac{(P75 - P120)}{P75} \times 100 \leq 8.0;$$

wherein

P75 is the permittivity measured at 50 Hz and 75° C.;
P120 is the permittivity measured at 50 Hz and 120° C.;
and/or preferably the equation
$$\frac{(D75 - D110)}{D75} \times 100 \geq -10.0 \quad (b1)$$

more preferably the equation
$$20.0 \geq \frac{(D75 - D110)}{D75} \times 100 \geq -5.0$$

still more preferably the equation
$$15.0 \geq \frac{(D75 - D110)}{D75} \times 100 \geq 0.0$$

yet more preferably the equation
$$10.0 \geq \frac{(D75 - D110)}{D75} \times 100 \geq 2.0$$

wherein

D75 is the dissipation (tan delta) measured at 50 Hz and 75° C.;
D110 is the dissipation (tan delta) measured at 50 Hz and 110° C.
and/or preferably the equation
$$\frac{(D75 - D120)}{D75} \times 100 \geq 10.0 \quad (b2)$$

more preferably the equation
$$50.0 \geq \frac{(D75 - D120)}{D75} \times 100 \geq 12.0$$

still more preferably the equation
$$40.0 \geq \frac{(D75 - D120)}{D75} \times 100 \geq 15.0$$

yet more preferably the equation
$$30.0 \geq \frac{(D75 - D120)}{D75} \times 100 \geq 20.0$$

wherein

D75 is the dissipation (tan delta) measured at 50 Hz and 75° C.;
D120 is the dissipation (tan delta) measured at 50 Hz and 120° C.

Additionally the capacitor film and/or the polypropylene homopolymer (H-PP) as defined in the last three previous paragraphs preferably (a) has/have <2,1> regiodefects in an amount of equal or below 0.4 mol.-%, preferably of equal or below than 0.2 mol.-%, more preferably of not more than 0.1 mol.-%, yet more preferably are not detectable, determined by $^{13}$C-NMR spectroscopy,
and/or
(b) has/have an ash content of below 5 ppm up to 500 ppm, more preferably of 10 to 400 ppm, still more preferably of 30 to 500 ppm, yeti more preferably of 40 to 400 ppm, like of 50 to 300 ppm;
and/or
(c) contain(s) nanosized catalyst fragments (F) with a mean particle size d50 of below 1 μm, more preferably of below 800 nm, still more preferably of 20 to 600 nm, yet more preferably of 30 to 500 nm, like of 30 to 300 nm;
and/or
(d) has/have a melting temperature ($T_m$) of at least 155° C., more preferably of at least 158° C., still more preferably of at least 160° C., yet more preferably in the range of 155 to 168° C., still yet more preferably in the range of 155 to 165° C., like in the range of 157 to 163° C. or like in the range of 159 to 163° C.;
and/or
(e) has/have crystallization temperature ($T_c$) of at least 110° C., more preferably of at least 111° C., still more preferably in the range of 110 to 120° C., yet more preferably in the range of 110 to 118° C.

Finally the capacitor film and/or the propylene homopolymer (H-PP) may be additionally featured by (a) an breakdown voltage at 100° C. of equal or more than 350 AC/μm, more preferably of equal or more than 380 AC/μm,
and/or
(b) a field strength at breakdown being at least 550 VDC/μm, measured on a biaxially oriented polypropylene (BOPP) film of thickness of 6.5 to 7 μm made from said polypropylene (PP) at a draw ratio in machine direction and in transverse direction of 4.5×9.5.

Catalyst Comprising a Solid Catalyst System (SCS)

As pointed out above the specific polypropylene (PP) as defined above and used for the manufacture of the capacitor film is obtainable, preferably obtained, by the use of a catalyst comprising a specific solid catalyst system (SCS). Accordingly in the following the catalyst comprising the solid catalyst system (SCS), its preparation, as well as the polymerization process of the instant polypropylene (PP) will be described in more detail.

The catalyst of the instant comprises
(a) a solid catalyst system (SCS)
(b) optionally a cocatalyst, like an aluminum compound, and
(c) optionally an external donor, like an hydrocarbyloxy silane compound.

The solid catalyst system (SCS) used preferably comprises
(a) a compound of a transition metal which metal is preferably selected from one of the groups 4 to 6, in particular of group 4, like Ti, of the periodic table (IUPAC),
(b) a compound of a metal which metal is selected from one of the groups 1 to 3 of the periodic table (IUPAC), and
(c) an (internal) electron donor (E).

Preferably said solid catalyst system (SCS) has
(a) a pore volume measured according ASTM 4641 of less than 1.40 ml/g,
and/or
(b) a surface area measured according to ASTM D 3663 of lower than 30 m$^2$/g,
and/or
(c) a mean particle size d50 in the range of 20 to 200 μm.

A remarkable feature of the used catalyst system (SCS) is that it is of solid form. In other words for the polypropylene (PP) polymerization an heterogeneous catalysis is applied, i.e. the aggregate state (solid state) of the catalyst system (SCS) differs from the aggregate state of the reactants, i.e. the propylene and optionally other α-olefins used. Different to known solid catalyst systems the solid catalyst system (SCS) used in the present invention is a so-called self-supported catalyst system, or in other words the solid catalyst system (SCS) used does not comprise external support material. The purpose of such "external support material" is that the active catalyst species are deposited on the solid support material and in the optional pores of said solid support material, respectively. Typical external support materials are organic or inorganic support materials, like silica, MgCl$_2$ or porous polymeric material. These inert external support materials are generally used in amounts of at least 50 wt.-%, more preferably of at least 70 wt.-%.

The catalyst used in the present invention does not contain external support material as defined above. However, according to the present invention the solid catalyst system (SCS) may comprises catalytically inactive solid material in amounts of less than 40 wt.-% based on the solid catalyst system (SCS). This material does not act as support material, i.e. it is not used in order to get a solid catalyst system. This catalytically inactive solid material is present during the solid catalyst system (SCS) preparation and thus is not added externally (subsequent to the catalyst preparation) as it is the case for conventional supported catalyst systems. The amount of such catalytically inactive solid material within the obtained solid catalyst system (SCS) is preferably less than 30.0 wt.-%, yet more preferably below 20.0 wt.-%, or preferably below 10 wt-%, based on the solid catalyst system (SCS). This catalytically inactive solid material is nano-sized as will be disclosed in more detail below.

Typically the solid catalyst system (SCS) has a surface area measured according to the commonly known BET method with N$_2$ gas as analysis adsorptive (ASTM D 3663) of less than 30 m$^2$/g, e.g. less than 20 m$^2$/g. In some embodiments the surface area is more preferably of less than 15 m$^2$/g, yet more preferably of less than 10 m$^2$/g. In some embodiments, the solid catalyst system (SCS) shows a surface area of 5 m$^2$/g or less, which is the lowest detection limit with the methods used in the present invention.

The solid catalyst system (SCS) can be additionally defined by the pore volume measured according to ASTM 4641. Thus it is appreciated that the solid catalyst system (SCS) has a pore volume of less than 1.0 ml/g, although higher pore volumes are possible in some embodiments. In some embodiments the pore volume is more preferably of less than 0.5 ml/g, still more preferably of less than 0.3 ml/g and even less than 0.2 ml/g. In another preferred embodiment the pore volume is not detectable when determined according to ASTM 4641.

Moreover the solid catalyst system (SCS) typically has a mean particle size (d50) of not more than 500 μm, i.e. preferably in the range of 2 to 500 μm, more preferably 5 to 200 μm. It is in particular preferred that the mean particle size (d50) is below 100 μm, still more preferably below 80 μm. A preferred range for the mean particle size (d50) is 5 to 80 μm, and in some embodiments 10 to 60 μm.

Depending on the preparation method of the solid catalyst system (SCS) as defined in detail below the SPAN value, indicating the broadness of particle size distribution, may vary in a broad range. For instance solid catalyst systems (SCS) produced by the emulsion-solidification method have SPAN values below 2.0, i.e. in the range of 0.5 to below 2.0, like 0.7 to 1.5, whereas the SPAN values of the solid catalyst systems (SCS) obtained by more traditional precipitation method are of at least 2.0, more preferably of at least 3.0, yet more preferably of at least 4.0, like in the range of 4.0 to 7.0. It is especially preferred that the solid catalyst system (SCS) has SPAN values below 2.0, i.e. in the range of 0.5 to below 2.0, like 0.7 to 1.5.

Furthermore the solid catalyst system (SCS) may comprise inclusions. Inclusions in accordance with the present invention do not comprise catalytically active sites and may be present in the form of hollow voids, in the form of liquid-filled hollow voids, in the form of hollow voids partially filled with liquid, in the form of solid material or in the form of hollow voids partially filled with solid material. In particular the inclusions are solid material, i.e. catalytically inactive solid material.

Accordingly the solid catalyst system (SCS) preferably comprises solid material, wherein said material does not comprise catalytically active sites and optionally has a specific surface area below 500 m$^2$/g, and/or a mean particle size (d50) below 200 nm.

The expression "does not comprise catalytically active sites" or "catalytically inactive" shall in particular indicate that the solid material does not comprise, i.e. does not consist of, components and compounds, like transition metal compounds of group 3 to 10 of the periodic table (IUPAC), which has catalytic activity in polymerization processes. Thus in a preferred embodiment the solid material is catalytically inert in polymerization processes, in particular in polymerization processes for the preparation of polyolefin, like polypropylene or polyethylene.

The term "inert" is understood as defined by IUPAC (IUPAC Compendium of Chemical Terminology 2nd Edition (1997)). Accordingly inert is something in case it is unreactive under specified conditions. The "specific conditions" in the present applications are the conditions under which the catalyst is prepared and conditions under which the polymerization of monomers as defined is carried out. Accordingly the solid material is inert preferably in a temperature range of −50 to 200° C., more preferably of −20 to 150° C., at a pressure from 1 to 100 bar, more preferably from 10 to 100 bar, yet more preferably from 15 to 90 bar, still yet more preferably from 20 to 70 bar.

Such a catalytically inactive solid material is dispersed within the solid catalyst system (SCS). Accordingly the solid catalyst system (SCS) can be seen also as a matrix in which the catalytically inactive solid material is dispersed, i.e. form a dispersed phase within the matrix phase of the solid catalyst system (SCS). The matrix is then constituted by the catalytically active components as defined herein, in particular by the transition metal compounds of groups 3 to 10 of the periodic table (IUPAC) and optionally the metal compounds of groups 1 to 3 of the periodic table (IUPAC). Of course all the other catalytic compounds as defined in the instant invention can additionally constitute to the matrix of the solid catalyst system (SCS) in which the catalytically inactive solid material is dispersed.

As mentioned above, the catalytically inactive solid material usually constitutes only a minor part of the total mass of the solid catalyst system (SCS). Accordingly the solid catalyst system (SCS) comprises less than 40 wt.-%, preferably less than 30 wt-% catalytically inactive solid material, more preferably less than 20 wt.-%. It is in particular preferred that the solid catalyst system (SCS) comprises the catalytically inactive solid material, if present in the solid catalyst system (SCS), in the range of 1 to 30 wt.-%, more preferably in the range of 1 to 20 wt.-% and yet more preferably in the range of 1 to 10 wt.-%.

The catalytically inactive solid material may be of any desired shape, including spherical as well as elongated shapes and irregular shapes. The catalytically inactive solid material in accordance with the present invention may have a plate-like shape or they may be long and narrow, for example in the shape of a fiber.

Preferred catalytically inactive solid material are inorganic materials as well as organic, in particular organic polymeric materials, suitable examples being nano-materials, such as silica, montmorillonite, carbon black, graphite, zeolites, alumina, as well as other inorganic particles, including glass nano-beads or any combination thereof. Suitable organic particles, in particular polymeric organic particles, are nano-beads made from polymers such as polystyrene, or other polymeric materials. In any case, the catalytically inactive solid material employed of the solid catalyst system (SCS) has to be inert towards the catalytically active sites, during the preparation of the solid catalyst system (SCS) as well as during the subsequent use in polymerization reactions. This means that the catalytically inactive solid material is not to be interfered in the formation of active centres.

Accordingly it is particular preferred that the catalytically inactive solid material is selected form spherical particles of nano-scale consisting of $SiO_2$, polymeric materials and/or $Al_2O_3$.

By nano-scale when discussing the catalytically inactive solid material of the solid catalyst system (SCS) is understood that the catalytically inactive solid material has a mean particle size (d50) of equal or below 200 nm, more preferred equal or below 150 nm, still more preferred below 100 nm. Accordingly it is preferred that the catalytically inactive solid material has a mean particle size (d50) of 10 to 200 nm, more preferred 10 to 100 nm, still more preferably from 10 to 90 nm, yet more preferred 10 to 80 nm.

The solid catalyst system (SCS) is preferably obtainable, i.e. obtained, by a process comprising contacting (a) a solution of a complex (C) of a metal which is selected from one of the groups 1 to 3 of the periodic table (IUPAC) and an electron donor (E), said complex (C) is obtained by reacting a compound (CM) of said metal with said electron donor (E) or a precursor (EP) thereof, with (b) a liquid transition metal compound (CT) or a solution of a transition metal compound (CT).

Accordingly one important aspect of the preparation of the solid catalyst system (SCS) is that neither the complex (C) nor the transition metal compound (CT) are present in solid form during the catalyst system (SCS) preparation, as it is the case for supported catalyst systems.

The catalytically inactive solid material, if present, can be added to the system during the preparation either to (a) or (b) prior to contacting or after contacting, but before transforming the liquid catalyst into solid form.

The solution of a complex (C) of the metal which is selected from one of the groups 1 to 3 of the periodic table (IUPAC) and the electron donor (E) is obtained by reacting a compound (CM) of said metal with said electron donor (E) or a precursor (EP) thereof in an organic solvent.

The metal compound (CM) used for the preparation of the complex (C) may be any metal compound (CM) which is selected from one of the groups 1 to 3 of the periodic table (IUPAC). However it is preferred that the complex (C) is a Group 2 metal complex, even more preferred a magnesium complex. Accordingly it is appreciated that the metal compound (CM) used in the preparation of said complex (C) is a Group 2 metal compound, like a magnesium compound.

Thus first a metal compound (CM) which is selected from one of the groups 1 to 3 of the periodic table (IUPAC), preferably from a Group 2 metal compound, like from a magnesium compound, containing preferably an alkoxy moiety is produced. More preferably the metal compound (CM) to be produced is selected from the group consisting of a Group 2 metal dialkoxide, like magnesium dialkoxide, a complex containing a Group 2 metal dihalide, like magnesium dihalide, and an alcohol, and a complex containing a Group 2 metal dihalide, like magnesium dihalide, and a Group 2 metal dialkoxide, like magnesium dialkoxide.

Thus the metal compound (CM) which is selected from one of the groups 1 to 3 of the periodic table (IUPAC), preferably from the Group 2 metal compound, like from the magnesium compound, is usually titaniumless.

Most preferably, the magnesium compound is provided by reacting an alkyl magnesium compound with an alcohol. Thereby, at least one magnesium compound precursor, selected from the group consisting of a dialkyl magnesium $R_2Mg$, and an alkyl magnesium alkoxide RMgOR, wherein each R is an identical or a different $C_1$ to $C_{20}$ alkyl, is reacted with at least one alcohol, selected from the group consisting of monohydric alcohols R'OH and polyhydric alcohols $R'(OH)_m$, wherein R' is a $C_1$ to $C_{20}$ hydrocarbyl group and m is an integer selected from 2, 3, 4, 5 and 6, to give said magnesium compound (CM). R' is the same or different in the formulas R'OH and $R'(OH)_m$. According to one embodiment alcohol can contain an additional oxygen bearing moiety being different to a hydroxyl group, e.g. an ether group. The R of the dialkyl magnesium is preferably an identical or different $C_4$ to $C_{12}$ alkyl. Typical magnesium alkyls are ethylbutyl magnesium, dibutyl magnesium, dipropyl magnesium, propylbutyl magnesium, dipentyl magnesium, butylpentyl magnesium, butyloctyl magnesium and dioctyl magnesium. Typical alkyl-alkoxy magnesium compounds are ethyl magnesium butoxide, magnesium dibutoxide, butyl magnesium pentoxide, magnesium dipentoxide, octyl magnesium butoxide and octyl magnesium octoxide. Most preferably, one R is a butyl group and the other R of $R_2Mg$ is an octyl group, i.e. the dialkyl magnesium compound is butyl octyl magnesium.

The alcohol used in the reaction with the magnesium compound precursor as stated in the previous paragraph is a monohydric alcohol, typically $C_1$ to $C_{20}$ monohydric alcohols, a polyhydric (by definition including dihydric and higher alcohols) alcohol or a mixture of at least one monohydric alcohol and at least one polyhydric alcohol. Magnesium enriched complexes can be obtained by replacing a part of the monohydric alcohol with the polyhydric alcohol. In one embodiment it is preferred to use one monohydric alcohol only.

Preferable monohydric alcohols are those of formula R'OH in which R' is a $C_2$ to $C_{16}$ alkyl group, most preferably a $C_4$ to $C_{12}$ alkyl group, like 2-ethyl-1-hexanol.

Typical polyhydric alcohols are ethylene glycol, propene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, glycerol, trimethylol propane and pentaerythritol. Most preferably the polyhydric alcohol is selected from the group consisting of ethylene glycol, 2-butyl-2-ethyl-1,3-propanediol and glycerol.

The reaction conditions used to obtain the metal compound (CM) which is selected from one of the groups 1 to 3 of the periodic table (IUPAC), preferably the metal compound (CM) of Group 2, even more preferred the magnesium compound, may vary according to the used reactants and agents. However according to one embodiment of the present invention, said magnesium compound precursor is reacted with said at least one alcohol at temperature of 30 to 80° C. for 10 to 90 min, preferably about 30 min.

After having obtained the metal compound (CM) which is selected from one of the groups 1 to 3 of the periodic table (IUPAC), preferably the metal compound of Group 2, even more preferred the magnesium compound, said compound (CM) is further reacted with an electron donor (E) or electron donor precursor (EP) as known in the prior art. The electron donor (E) is preferably a mono- or diester of a carboxylic acid or diacid, or an ether compound. Said carboxylic acid ester or diester, e.g. the mono- or diester of the aromatic or aliphatic, saturated or unsaturated carboxylic acid or diacid, can be formed in situ by reaction of an carboxylic acid halide or diacid halide, i.e. a preferred electron donor precursor (EP), with a $C_2$ to $C_{16}$ alkanol and/or diol, optionally containing an additional oxygen bearing moiety being different to a hydroxyl group, e.g. an ether group. Preferably said metal compound (CM) reacts with an electron donor precursor (EP), i.e. with a dicarboxylic acid dihalide having preferably the formula (I)

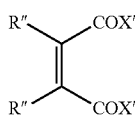

wherein
each R" is an identical or different $C_1$ to $C_{20}$ hydrocarbyl group or both R"s form together with the two unsaturated carbons seen in the formula (I) a $C_5$ to $C_{20}$ saturated or unsaturated aliphatic or aromatic ring, and
X' is a halogen
to give the complex (C).

Among non-aromatic dicarboxylic acid dihalides, the group consisting of maleic acid dihalide, fumaric acid dihalide and their R" substituted derivatives such as citraconic acid dihalide and mesaconic acid dihalide, respectively, are the most important.

Among the cyclic, aliphatic or aromatic, dicarboxylic acid dihalides, the group consisting of phthalic acid dihalide (1,2-benzene dicarboxylic acid dihalide), its hydrogenate 1,2-cyclohexane dicarboxylic acid dihalide, and their derivatives, are the most important. Commonly used dicarboxylic acid dihalide is phthaloyl dichloride.

Preferably the magnesium compound is reacted with the dicarboxylic acid halide in a molar ratio $Mg_{total\ added}$/dicarboxylic acid halide of 1:1 and 1:0.1, preferably between 1:0.6 and 1:0.25.

Preferably the metal compound (CM) which is selected from one of the groups 1 to 3 of the periodic table (IUPAC), more preferably the metal compound of Group 2, even more preferably the magnesium compound, is reacted with the electron donor (E) or with the electron donor precursor (EP), i.e. the dicarboxylic acid dihalide, under at least one of the following conditions:
  adding said dicarboxylic acid dihalide under room temperature and
  heating the obtained reaction mixture to a temperature of 20 to 80° C., preferably of 50 to 70° C.
  keeping the temperature for 10 to 90 min, preferably for 25 to 35 min.

The organic solvent used for the preparation of the complex (C) can be any organic solvent as long as it is ensured that the complex (C) is dissolved at ambient temperatures, i.e. at temperatures up to 80° C. (20 to 80° C.). Accordingly it is appreciated that the organic solvent comprises, preferably consists of, $C_5$ to $C_{10}$ hydrocarbon, more preferably of a $C_6$ to $C_{10}$ aromatic hydrocarbon, like toluene.

Suitable transition metal compounds (CT) are in particular transition metal compounds (CT) of transition metals of groups 4 to 6, in particular of group 4 or 5, of the periodic table (IUPAC). Suitable examples include Ti and V, in particular preferred is a compound of Ti, like $TiCl_4$.

In addition to the compounds described above, the catalyst component can comprise e.g. reducing agents, like compounds of group 13, preferably Al-compounds containing alkyl and/or alkoxy residues, and optionally halogen residues. These compounds can be added into the catalyst preparation at any step before the final recovery.

The olefin polymerization catalyst used in the invention may comprise in addition to the catalyst components (solid catalyst system) conventional cocatalyst, e.g. those based on compounds of group 13 of the periodic table (IUPAC), e.g. organo aluminum, such as aluminum compounds, like aluminum alkyl, aluminum halide or aluminum alkyl halide compounds (e.g. triethylaluminum) compounds, can be mentioned.

Additionally one or more external donors can be used which may be typically selected e.g. from silanes or any other well known external donors in the field. External donors are known in the art and are used as stereoregulating agent in propylene polymerization. The external donors are preferably selected from hydrocarbyloxy silane compounds and hydrocarbyloxy alkane compounds.

Typical hydrocarbyloxy silane compounds have the formula (II)

wherein
R' is an a- or b-branched C3-C12-hydrocarbyl,
R" a C1-C12-hydrocarbyl, and
0 is an integer 1-3.

More specific examples of the hydrocarbyloxy silane compounds which are useful as external electron donors in the invention are diphenyldimethoxy silane, dicyclopentyldimethoxy silane, dicyclopentyldiethoxy silane, cyclopentylmethyldimethoxy silane, cyclopentylmethyldiethoxy silane, dicyclohexyldimethoxy silane, dicyclohexyldiethoxy silane, cyclohexylmethyldimethoxy silane, cyclohexylmethyldiethoxy silane, methylphenyldimethoxy silane, diphenyldiethoxy silane, cyclopentyltrimethoxy silane, phenyltrimethoxy silane, cyclopentyltriethoxy silane, phenyltriethoxy silane. Most preferably, the alkoxy silane compound having the formula (II) is dicyclopentyl dimethoxy silane or cyclohexylmethyl dimethoxy silane.

After contacting the solution of the complex (C) with the liquid of the transition metal compound (CT) or the solution of the transition metal compound (CT) either the solid catalyst system (SCS) spontaneous precipitates or alternatively an emulsion is formed, the latter being preferred. Whether an emulsion is obtained or an immediate precipitation occurs depend on the specific conditions chosen. Reference is made inter alia to the International patent applications WO 03/000754, WO 03/000757, and WO 2007/077027 as well as to the European patent application EP 2 251 361. In the following the precipitation method as well as the emulsion method is described in more detail.

Emulsion Method:

The solid catalyst system (SCS) according to the emulsion method is obtained by (a) preparing a solution of a complex (C) of a metal which is selected from one of the groups 1 to 3 of the periodic table (IUPAC) and an electron donor (E), said complex (C) is obtained by reacting a compound (CM) of said metal with said electron donor (E) or a precursor (EP) thereof in an organic solvent,
(b) mixing said solution of complex (C) with a liquid transition metal compound (CT),
(c) obtaining thereby an emulsion of a continuous phase and a dispersed phase, said dispersed phase is in form of droplets and comprises the complex (C) and the transition metal compound (CT),
(d) solidifying the droplets of the dispersed phase obtaining thereby the solid catalyst system (SCS).

Accordingly for the emulsion method the complex (C) is preferably dissolved in an $C_6$ to $C_{10}$ aromatic hydrocarbon, like toluene and contacted with a liquid transition metal compound (CT), preferably with a liquid transition metal compound (CT) of transition metals of groups 4 to 6, in particular of group 4, of the periodic table (IUPAC), like Ti (e.g. $TiCl_4$). Due to the contact of the solution of the complex (C) with the liquid transition metal compound (CT) an emulsion is formed. The production of a two-phase, i.e. of an emulsion, is encouraged by carrying out the contacting at low temperature, specifically above 10° C. but below 60° C., preferably between above 20° C. and below 50° C. The emulsion comprises a continuous phase and a dispersed phase in form of droplets. In the dispersed phase the complex (C) as well as the transition metal compound (CT) are present.

Additional catalyst components, like an aluminium compound, like aluminium alkyl, aluminium alkyl halide or aluminium alkoxy or aluminium alkoxy alkyl or halide or other compounds acting as reducing agents can be added to the reactions mixture at any step before the final recovery of the solid catalyst system (SCS). Further, during the preparation, any agents enhancing the emulsion formation can be added. As examples can be mentioned emulsifying agents or emulsion stabilisers e.g. surfactants, like acrylic or metacrylic polymer solutions and turbulence minimizing agents, like alpha-olefin polymers without polar groups, like polymers of alpha olefins of 6 to 20 carbon atoms.

Suitable processes for mixing the obtained emulsion include the use of mechanical as well as the use of ultrasound for mixing, as known to the skilled person. The process parameters, such as time of mixing, intensity of mixing, type of mixing, power employed for mixing, such as mixer velocity or wavelength of ultrasound employed, viscosity of solvent phase, additives employed, such as surfactants, etc. are used for adjusting the size of the solid catalyst system particles (SCS).

Said solid catalyst system particles (SCS) may then be formed and recovered in usual manner, including the solidification of the catalyst particles by heating (for instance at a temperature of 70 to 150° C., more preferably at 90 to 110° C.) and separating steps (for recovering the catalyst particles). In this connection reference is made to the disclosure in the international applications WO 03/000754, WO 03/000757, WO 2007/077027, WO 2004/029112 and WO 2007/077027 disclosing suitable reaction conditions. This disclosure is incorporated herein by reference. The catalyst particles obtained may furthermore be subjected to further post-processing steps, such as washing, stabilizing, prepolymerization, prior to the final use in polymerisation process. In case the solid catalyst system (SCS) contains inclusions, like catalytically inactive solid material, reference is made to WO 2007/077027, and EP 2 065 405.

Precipitation Method:

The solid catalyst system (SCS) according to the precipitation method is obtained by (a) preparing a solution of a complex (C) of a metal which is selected from one of the groups 1 to 3 of the periodic table (IUPAC) and an electron donor (E), said complex (C) is obtained by reacting a compound (CM) of said metal with said electron donor (E) or a precursor (EP) thereof in an organic solvent,
(b) combining said solution of complex (C) with a liquid transition metal compound (CT) or a solution of a transition metal compound (CT) resulting in a precipitation of said catalyst system (SCS) in the form of a solid particles.

Different to the emulsion process no emulsion is formed during the preparation of the solid catalyst system (SCS).

Accordingly for the precipitation method the complex (C) is preferably dissolved in an $C_6$ to $C_{10}$ aromatic hydrocarbon, like toluene and contacted with a liquid transition metal compound (CT), i.e with a transition metal compound (CT) being not solid. Thus either the transition metal compound (CT) as such is a liquid or it is dissolved in a solvent at ambient temperatures, i.e. at temperatures up to 80° C. (20 to 80° C.). If a solvent is used for the transition metal compound (CT), it can be any organic solvent and can be the same as the organic solvent used for the complex (C) or can be different thereto, the latter being preferred. Preferably the organic solvent for the transition metal compound (CT) is $C_5$ to $C_{10}$ hydrocarbon, more preferably of a $C_6$ to $C_{10}$ alkane, like heptanes, octane or nonane, or any mixtures thereof. The transition metal compound (CT) is preferably a transition metal compound (CT) of transition metals of groups 4 to 6, in particular of group 4, of the periodic table (IUPAC), like Ti (e.g. $TiCl_4$). Due to the contact of the solution of the complex (C) with the liquid transition metal compound (CT) or with a solution of the transition metal compound (CT) precipitation occurs and the solid catalyst system (SCS) is formed.

The term "precipitation" according to this invention means that during the catalyst preparation a chemical reaction in a solution takes place leading to the desired catalyst system (SCS) insoluble in said solution. Such a precipitated solid catalyst system (SCS) is different in form and shape to a solid catalyst system (SCS) obtained by the emulsion method discussed above.

Preferably the combining of the solution of the complex (C) with the liquid transition metal compound (CT) or with the solution of the transition metal compound (CT) is effected at a temperature of at least 50° C., preferably in the temperature range of 50 to 110° C., like in the temperature range of 70 to 100° C., most preferably in the range of 85 to 95° C. It is especially appreciated that after having combined the complex (C) and the transition metal compound (CT) that the whole reaction mixture is kept at least at 50° C., more preferably is kept in the temperature range of 50 to 110° C., like 70 to 100° C., most preferably in the range of 85 to 95° C., to secure full precipitation of the catalyst in form of a solid particle.

In addition it is possible, but not necessary to add some precipitating agent into solution of the complex (C) or the solution of the transition metal compound (CT). Such precipitating agents are able to effect morphology of the particles formed during the precipitation step. In a specific process no precipitating agent has been used. A precipitating agent according to this invention is an agent which promotes the precipitation of the catalyst system (SCS) in form of a solid particle. For instance the organic solvent used for the transition metal compound (CT) can promote the precipitating and thus act and used as a precipitating agent. However, the final catalyst does not contain such a medium. In addition, it is possible to use as separate precipitating agent so called seed material, like silica or $MgCl_2$ particles. However, the particle size of the seed materials might be undesirable big and might negatively influence the electrical properties. Accordingly it is appreciated that the catalyst system (SCS) used in the present application is free of any precipitating agent residues. "Free" in this context throughout the invention means that not more than 1.0 wt.-%, preferably not more than 0.5 wt.-%, more preferably not more than 0.05 wt.-%, still more preferably not more than 0.005 wt.-%, yet more preferably no detectable precipitating agent is present within the solid catalyst system (SCS).

Additional catalyst components, like the cocatalyst and/or the external donor, as described above, can be used as normally in olefin polymerisation catalyst.

When adding the solution of the complex (C) to the liquid transition metal compound (CT) or the solution of the transition metal compound (CT) mixing is appreciated. Suitable mixing techniques include the use of mechanical as well as the use of ultrasound for mixing, as known to the skilled person.

Further it is appreciated that the solvent for the complex (C) on the one hand and the solvent of the transition metal compound (CT) on the other hand are selected in a way which supports the immediate precipitation of the solid catalyst system (SCS). As stated above, the solvent for the complex (C) comprises, preferably consists of, $C_5$ to $C_{10}$ hydrocarbon, more preferably of a $C_6$ to $C_{10}$ aromatic hydrocarbon, like toluene. The solvent where the transition metal compound (CT), like $TiCl_4$, can be solved, can be the same as for the complex (C) or can be different thereto, the latter being preferred. Preferably the solvent for the transition metal compound (CT) is $C_5$ to $C_{10}$ hydrocarbon, more preferably of a $C_6$ to $C_{10}$ alkane, like heptanes, octane or nonane, or any mixtures thereof. It is in particular appreciated that the solvent for the complex (C) is $C_6$ to $C_{10}$ aromatic hydrocarbon, like toluene, and the solvent for the transition metal compound (CT) is a $C_6$ to $C_{10}$ alkane, like heptanes.

After precipitation the solid catalyst particle is washed in a known manner. Accordingly it is preferred that solid catalyst particle is washed with toluene, preferably with hot (e.g. 90° C.) toluene and subsequently with heptane, most preferably with hot (e.g. 90 C) heptane. Further washings, e.g. with gold heptanes, or pentane are possible as well. For further information with regard to the precipitation method, in particular to the precipitation method in which the solid catalyst system (SCS) contains catalytically inactive solid material, reference is made to EP 2 251 361.

Polymerization Process:

The polymerization process for producing the polypropylene as defined in the instant invention can be any known process, with the proviso that the catalyst comprising the catalyst system (SCS) as defined herein is employed.

Accordingly propylene and optionally ethylene and/or at least one $C_4$ to $C_{10}$ α-olefin is/are polymerized in the presence of the catalyst comprising the solid catalyst system (SCS) to obtain the polypropylene (PP) as defined in the instant invention. More precisely the process for the manufacture of the instant polypropylene (PP) can be a single stage process using a liquid phase, slurry phase or gas phase reactor. However it is preferred that the polypropylene (PP) is produced in a multistage process, comprising at least one slurry (bulk) phase reaction and at least one additional slurry and/or gas phase reactor in which the catalyst comprising the solid catalyst system (SCS) of the instant invention is employed.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315. They are incorporated herein by reference.

A further suitable slurry-gas phase process is the Spheripol® process of Basell.

Preferably the polypropylene (PP) is produced in the Spheripol® or in the Borstar®-PP process.

Accordingly in a first step the polypropylene (PP) which is used for the preparation of the capacitor film is preferably prepared by polymerizing, in a slurry reactor, for example a loop reactor, propylene optionally together with at least another $C_2$ to $C_{10}$ α-olefin (comonomers), in the presence of the catalyst comprising the solid catalyst system (SCS) to produce a part of the polypropylene (PP). This part is then transferred to a subsequent gas phase reactor, wherein in the gas phase reactor propylene is reacted optionally together with comonomers as defined above in order to produce a further part in the presence of the reaction product of the first step. This reaction sequence provides a reactor blend of parts (i) (fraction (A)) and (ii) (fraction (B)) constituting a polypropylene (PP). It is of course possible by the present invention that the first reaction is carried out in a gas phase reactor while the second polymerization reaction is carried out in a slurry reactor, for example a loop reactor. It is furthermore also possible to reverse the order of producing parts (i) and (ii), which has been described above in the order of first producing part (i) and then producing part (ii). In addition to the reactors above it is possible to use additional polymerization reactors, and prepolymerization reactors. The above-discussed process, comprising at least two polymerization steps, is advantageous in view of the fact that it provides easily controllable reaction steps enabling the preparation of a desired reactor blend. The polymerization steps may be adjusted, for example by appropriately selecting monomer feed, comonomer feed, hydrogen feed, temperature and pressure in order to suitably adjust the properties of the polymerization products obtained.

With respect to the above-mentioned preferred slurry-gas phase process, the following general information can be provided with respect to the process conditions.

Temperature of from 40 to 110° C., preferably between 60 and 100° C., in particular between 70 and 90° C., with a pressure in the range of from 20 to 80 bar, preferably 30 to 60 bar, with the option of adding hydrogen in order to control the molecular weight. The reaction product of the slurry polymerization, which preferably is carried out in a loop reactor, is then transferred to the subsequent gas phase reactor, wherein the temperature preferably is within the range of from 50 to 130° C., more preferably 70 to 100° C., at a pressure in the range of from 5 to 50 bar, preferably 15 to 35 bar, again with the option of adding hydrogen in order to control the molecular weight.

The residence time can vary in the reactor zones identified above. In embodiments, the residence time in the slurry reaction, for example the loop reactor, is in the range of from 0.5 to 5 hours, for example 0.5 to 2 hours, while the residence time in the gas phase reactor generally will be from 1 to 8 hours.

The properties of the polypropylene (PP) produced with the above-outlined process may be adjusted and controlled with the process conditions as known to the skilled person, for example by one or more of the following process parameters: temperature, hydrogen feed, comonomer feed, propylene feed, catalyst type and amount of external donor, split between two or more components of a multimodal polymer.

The above process enables very feasible means for obtaining the reactor-made polypropylene (PP).

Film Forming Process

After the preparation of the polypropylene (PP), the polypropylene (PP) is subjected to a film forming process. Any film forming processes which are suitable for the manufacture of a capacitor film can be used.

In a preferred embodiment the polypropylene (PP) is not subjected to a washing step prior to the film forming process.

The capacitor film, i.e. the biaxially oriented polypropylene (BOPP), can be prepared by conventional drawing processes known in the art. Accordingly the process for the manufacture of a capacitor film, i.e. the biaxially oriented polypropylene (BOPP), according to this invention comprises the use of the polypropylene (PP) as defined herein and its forming into a film preferably by the tenter method known in the art.

The tenter method is in particular a method in which the polypropylene (PP) as defined herein is melt extruded from a slit die such as a T-die and cooled on a cooling drum obtaining an undrawn sheet. Said sheet is pre-heated for example with a heated metal roll and then drawn in the length direction between a plurality of rolls over which a difference in peripheral speeds is established and then both edges are gripped with grippers and the sheet is drawn in the transverse direction in an oven by means of a tenter resulting in a biaxially drawn film. The temperature of said stretched sheet during the longitudinal drawing is preferably controlled in such a way as to be within the temperature range of the melting point of the polypropylene as defined herein (machine direction: −20 to −5° C.; transverse direction: −10 to +15° C.). The uniformity of the film thickness on transverse drawing can be evaluated with the method in which a fixed region on the film is masked after drawing in the length direction and measuring the actual drawing factor by measuring the spacing of the said masking after transverse drawing.

Subsequently, the capacitor film, i.e. the biaxially oriented film (BOPP), can be treated by corona discharge in air, nitrogen, carbon dioxide gas or any of the mixtures on the surface to be metalized, to improve the adhesive strength to the metal to be deposited, and wound by a winder.

Further, the present invention is directed to the use of a polypropylene (PP) as dielectricum in a capacitor, wherein said polypropylene (PP)

fulfils (a1)

preferably the equation $\frac{(P75-P110)}{P75} \times 100 \leq 6.0$;

more preferably the equation $1.0 \leq \frac{(P75-P110)}{P75} \times 100 \leq 5.0$;

still more preferably the equation $1.5 \leq \frac{(P75-P110)}{P75} \times 100 \leq 4.5$;

yet more preferably the equation $2.0 \leq \frac{(P75-P110)}{P75} \times 100 \leq 4.0$;

wherein
P75 is the permittivity measured at 50 Hz and 75° C.,
P110 is the permittivity measured at 50 Hz and 110° C.;
and/or fulfils (a2)

preferably the equation $\frac{(P75-P120)}{P75} \times 100 \leq 12.0$;

more preferably the equation $2.0 \leq \frac{(P75-P120)}{P75} \times 100 \leq 11.0$;

till more preferably the equation $3.0 \leq \frac{(P75-P120)}{P75} \times 100 \leq 9.0$;

yet more preferably the equation $4.0 \leq \frac{(P75-P120)}{P75} \times 100 \leq 8.0$;

wherein
P75 is the permittivity measured at 50 Hz and 75° C.,
P120 is the permittivity measured at 50 Hz and 120° C.;
and/or fulfils (b1)

preferably the equation $\frac{(D75-D110)}{D75} \times 100 \geq -10.0$ more preferably the equation $20.0 \geq \frac{(D75-D110)}{D75} \times 100 \geq -5.0$ still more preferably the equation $15.0 \geq \frac{(D75-D110)}{D75} \times 100 \geq 0.0$ yet more preferably the equation $10.0 \geq \frac{(D75-D110)}{D75} \times 100 \geq 2.0$ wherein
D75 is the dissipation (tan delta) measured at 50 Hz and 75° C., D110 is the dissipation (tan delta) measured at 50 Hz and 110° C.;
and/or fulfils (b2)

preferably the equation $\frac{(D75 - D120)}{D75} \times 100 \geq 10.0$ more preferably the equation $50.0 \geq \frac{(D75 - D120)}{D75} \times 100 \geq 12.0$ still more preferably the equation $40.0 \geq \frac{(D75 - D120)}{D75} \times 100 \geq 15.0$ yet more preferably the equation $30.0 \geq \frac{(D75 - D120)}{D75} \times 100 \geq 20.0$ wherein
D75 is the dissipation (tan delta) measured at 50 Hz and 75° C.;
D120 is the dissipation (tan delta) measured at 50 Hz and 120° C.;
and/or
(c1) has a breakdown voltage at 100° C. of equal or more than 350 AC/μm, more preferably of equal or more than 380 AC/μm, measured on a biaxially oriented polypropylene (BOPP) film of thickness of 6.5 to 7 μm made from said polypropylene (PP) at a draw ratio in machine direction and in transverse direction of 4.5×9.5,
and/or
(c2) has a field strength at breakdown of at least 550 VDC/μm, measured on a biaxially oriented polypropylene (BOPP) film of thickness of 6.5 to 7 μm made from said polypropylene (PP) at a draw ratio in machine direction and in transverse direction of 4.5×9.5.

In a preferred embodiment the present invention is directed to the use of a polypropylene (PP) as dielectricum in a capacitor, as described above, wherein said polypropylene (PP)
(a) has/have <2,1> regiodefects in an amount of equal or below 0.4 mol.-%, preferably of equal or below than 0.2 mol.-%, more preferably of not more than 0.1 mol.-%, yet more preferably are not detectable, determined by $^{13}$C-NMR spectroscopy,
and/or
(b) has/have an ash content of below 5 ppm up to to 500 ppm, more preferably of 10 to 400 ppm, still more preferably of 30 to 500 ppm, yeti more preferably of 40 to 400 ppm, like of 50 to 300 ppm;
and/or
(c) contain(s) nanosized catalyst fragments (F) with a mean particle size d50 of below 1 μm, more preferably of below 800 nm, still more preferably of 20 to 600 nm, yet more preferably of 30 to 500 nm, like of 30 to 300 nm; and/or
(d) has/have a melting temperature ($T_m$) of at least 155° C., more preferably of at least 158° C., still more preferably of at least 160° C., yet more preferably in the range of 155 to 168° C., still yet more preferably in the range of 155 to 165° C., like in the range of 157 to 163° C. or like in the range of 159 to 163° C.;
and/or
(e) has/have crystallization temperature ($T_c$) of at least 110° C., more preferably of at least 111° C., still more preferably in the range of 110 to 120° C., yet more preferably in the range of 110 to 118° C.

In a preferred embodiment of the present invention the polypropylene (PP) used as dielectricum in a capacitor, as described above, is a propylene homopolymer (H-PP).

Optionally, the polypropylene (PP) or the propylene homopolymer (H-PP) is the only polymer component used as dielectricum in a capacitor film as described above.

Preferably the polypropylene (PP) is further defined as indicated above. It is in particular appreciated that the polypropylene (PP) is biaxially oriented, preferably has biaxially stretched with ratios indicated above.

Additionally the present invention is directed to the use of the capacitor film as defined herein in a capacitor.

In addition, the present invention is directed to a capacitor comprising at least one layer comprising a capacitor film as defined herein. Additionally it is preferred that the capacitor comprises a metal layer, in particular a metal layer obtained by the above described process.

The present invention is further described by way of examples.

EXAMPLES

A. Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the isotacticity, regio-regularity and comonomer content of the polymers.

Quantitative $^{13}$C {$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probe head at 125° C. using nitrogen gas for all pneumatics.

For polypropylene homopolymers approximately 200 mg of material was dissolved in 1,2-tetrachloroethane-d$_2$ (TCE-d$_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromoleucles 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra For ethylene-propylene copolymers approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6k) transients were acquired per spectra.

Quantitative $^{13}C$ $\{^{1}H\}$ NMR spectra were processed, integrated and relevant quantitative properties determined from the integrals using proprietary computer programs.

For ethylene-propylene copolymers all chemical shifts were indirectly referenced to the central methylene group of the ethylene block (EEE) at 30.00 ppm using the chemical shift of the solvent. This approach allowed comparable referencing even when this structural unit was not present.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio defects:

$P_{total}=P_{12}+P_{21e}$

The mole percent of 2,1 erythro regio defects was quantified with respect to all propene:

[21e] mol %=100*($P_{21e}/P_{total}$)

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The mole fraction of ethylene in the polymer was quantified using the method of Wang et. al. (Wang, W-J., Zhu, S., Macromolecules 33 (2000), 1157) through integration of multiple signals across the whole spectral region of a $^{13}C$ $\{^{1}H\}$ spectra acquired using defined conditions. This method was chosen for its accuracy, robust nature and ability to account for the presence of regio-defects when needed. Integral regions were slightly adjusted to increase applicability to a wider range of comonomer contents.

The mole percent comonomer incorporation in the polymer was calculated from the mole fraction according to:

E[mol %]=100*fE

The weight percent comonomer incorporation in the polymer was calculated from the mole fraction according to:

E[wt %]=100*(fE*28.05)/((fE*28.05)+ ((1-fE)*42.08))

The comonomer sequence distribution at the triad level was determined using the method of Kakugo et al. (Kakugo, M., Naito, Y., Mizunuma, K., Miyatake, T. Macromolecules 15 (1982) 1150) through integration of multiple signals across the whole spectral region of a $^{13}C$ $\{^{1}H\}$ spectra acquired using defined conditions. This method was chosen for its robust nature. Integral regions were slightly adjusted to increase applicability to a wider range of comonomer contents.

The mole percent of a given comonomer triad sequence in the polymer was calculated from the mole fraction determined by the method of Kakugo et at. (Kakugo, M., Naito, Y., Mizunuma, K., Miyatake, T. Macromolecules 15 (1982) 1150) according to:

XXX[mol %]=100*fXXX

The mole fraction comonomer incorporation in the polymer, as determined from the comonomer sequence distribution at the triad level, were calculated from the triad distribution using known necessary relationships (Randall, J. Macromol. Sci., Rev. Macromol. Chem. Phys. 1989, C29, 201):

fXEX=fEEE+fPEE+fPEP fXPX=fPPP+fEPP+fEPE where PEE and EPP represents the sum of the reversible sequences PEE/EEP and EPP/PPE respectively.

The randomness of the comonomer distribution was quantified as the relative amount of isolated ethylene sequences as compared to all incorporated ethylene. The randomness was calculated from the triad sequence distribution using the relationship:

R(E)[%]=100*(fPEP/fXEX)

Molecular Weight Averages, Molecular Weight Distribution, Branching Index (Mn, Mw, MWD, g') determined by SEC/VISC-LS Molecular weight averages (Mw, Mn), molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4 2003. A PL 220 (Polymer Laboratories) GPC equipped with a refractive index (RI), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Polymer Laboratories as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 µL of sample solution were injected per analysis. The corresponding detector constants as well as the inter detector delay volumes were determined with a narrow PS standard (MWD=1.01) with a molar mass of 132900 g/mol and a viscosity of 0.4789 dl/g. The corresponding dn/dc for the used PS standard in TCB is 0.053 cm$^3$/g.

The molar mass at each elution slice was determined by light scattering using a combination of two angels 15° and 90°. All data processing and calculation was performed using the Cirrus Multi-Offline SEC-Software Version 3.2 (Polymer Laboratories a Varian inc. Company). The molecular weight was calculated using the option in the Cirrus software "use combination of LS angles" in the field "sample calculation options subfield slice MW data from".

The data processing is described in details in G. Saunders, P. A. G: Cormack, S. Graham; D. C. Sherrington, Macromolecules, 2005, 38, 6418-6422. Therein the Mw, at each slice is determined by the 90° angle by the following equation:

$$Mw_i = \frac{K_{LS} * R(\theta)^{90°}}{\frac{dn}{dc} * R * P(\theta)}$$

The Rayleigh ratio $R(\theta)^{90°}$ of the 90° angle is measured by the LS detector and R is the response of the RI-detector. The particle scatter function $P(\theta)$ is determined by the usage of both angles (15° and 90°) as described by C. Jackson and H. G. Barth (C. Jackson and H. G. Barth, "Molecular Weight Sensitive Detectors" in Handbook of Size Exclusion Chromatography and related techniques, C.-S. Wu, 2$^{nd}$ ed., Marcel Dekker, New York, 2004, p. 103). For the low and high molecular region in which less signal of the LS detector or RI detector respectively was achieved a linear fit was used to correlate the elution volume to the corresponding molecular weight.

The dn/dc used in the equation is calculated from the detector constant of the RI detector, the concentration c of the sample and the area of the detector response of the analysed sample. The relative amount of branching is determined using the g'-index of the branched polymer sample. The long chain branching (LCB) index is defined as g'=[η]$_{br}$/[η]$_{lin}$. It is well known if the g' value increases the branching content decreases. [η] is the intrinsic viscosity at 160° C. in trichlorobenzene of the polymer sample at a certain molecular weight and is measured by an online viscosity and a concentration detector. The intrinsic viscosities were measured as described in the handbook of the Cirrus Multi-Offline SEC-Software Version 3.2 with use of the Solomon-Gatesman equation.

The necessary concentration of each elution slice is determined by a RI detector.

[η]$_{lin}$ is the intrinsic viscosity of a linear sample and [η]$_{br}$ the viscosity of a branched sample of the same molecular weight and chemical composition. The number average of $g'_n$ and the weight average $g'_w$ are defined as:

$$g'_n = \frac{\sum_0^i a_i * \frac{[\eta]_{br,i}}{[\eta]_{lin,i}}}{\sum a_i}$$

$$g'_w = \frac{\sum_0^i A_i * \frac{[\eta]_{br,i}}{[\eta]_{lin,i}}}{\sum_0^i A_i * \left(\frac{[\eta]_{br,i}}{[\eta]_{lin,i}}\right)^2}$$

where $a_i$ is dW/dlogM of fraction i and $A_i$ is the cumulative dW/dlogM of the polymer up to fraction i. The [η]$_{lin}$ of the linear reference (linear isotactic PP) over the molecular weight was measured with an online viscosity detector. Following K and α values were obtained (K=30.68*10$^{-3}$ and α=0.681) from the linear reference in the molecular weight range of log M=4.5-6.1. The [η]$_{lin}$ per slice molecular weight for the g' calculations was calculated by following relationship [η]$_{lin,i}$=K*M$_i^\alpha$. [η]$_{br,i}$ was measured for each particular sample by online viscosity and concentration detector.

MFR$_2$ (230° C.) is measured according to ISO 1133 (230° C., 2.16 kg load)

Xylene Cold Soluble Fraction (XCS wt %)

Content of xylene cold solubles (XCS) is determined at 25° C. according ISO 16152; first edition; 2005-07-01.

Melting temperature (T$_m$) and heat of fusion (H$_f$), crystallization temperature (T$_c$) and heat of crystallization (H$_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization (H$_c$) are determined from the cooling step, while melting temperature and heat of fusion (H$_f$) are determined from the second heating step Tensile modulus in machine direction was determined according to ISO 527-3 at 23° C. on the biaxially oriented films. Testing was performed at a cross head speed of 1 mm/min.

Electrical breakdown strength (EB63%) The electrical breakdown strength was measured according to IEC 60243-2 (1998). The obtained raw data was evaluated according to IEC 60727, part 1 & 2

The method (IEC 60243-2) describes a way to measure the electrical breakdown strength for insulation materials on compression moulded plaques. The electrical breakdown strength is determined within a high voltage cabinet using metal rods as electrodes as described in IEC 60243-2. The voltage is raised over the film/plaque at 2 kV/s until a breakdown occurs.

Definition $Eb: E_b = U_b/d$

The electrical field strength (U$_b$, [kV]) in the test sample at which breakdown occurs. In homogeneous plaques and films the electrical electric breakdown strength ($E_b$,[kV/mm]) can be calculated by dividing $U_b$ by the thickness of the plaque/film (d, [mm]) The unit of $E_b$ is kV/mm. For each BOPP film, 10 individual breakdown measurements are performed. To characterize a material via its breakdown strength a parameter describing an average breakdown strength must be derived from the 10 individually obtained results. This parameter is often referred to as Eb63% parameter. To obtain this parameter a statistical evaluation as described in IEC 60727, part 1 & 2 was carried out which is briefly outlined here: The 10 individual breakdown results ($E_b$, kV/mm) per BOPP film are evaluated using a Weibull plot, wherein the 63 percentile (scale parameter of the Weibull distribution) is used to characterize the material's breakdown strength (Eb63%). The β-parameter is the slope of the linear regression curve through these 10 points. The β-parameter is the shape parameter of the Weibull distribution.

Electrical conductivity was calculated as the inverse of the electrical resistance as determined in accordance to ASTM D257.

Porosity: BET with $N_2$ gas, ASTM 4641, apparatus Micromeritics Tristar 3000; sample preparation: at a temperature of 50° C., 6 hours in vacuum.

Surface area: BET with $N_2$ gas ASTM D 3663, apparatus Micromeritics Tristar 3000: sample preparation at a temperature of 50° C., 6 hours in vacuum.

Ash content: Ash content is measured according to ISO 3451-1 (1997)

Mean particle size (d50) is given in nm and measured with Coulter Counter LS200 at room temperature with n-heptane as medium, particle sizes below 100 nm by transmission electron microscopy.

Particle size (d10) is given in nm and measured with Coulter Counter LS200 at room temperature with n-heptane as medium.

Particle size (d90) is given in nm and measured with Coulter Counter LS200 at room temperature with n-heptane as medium.

SPAN is defined as follows:

$$\frac{d90[\mu m] - d10[\mu m]}{d50[\mu m]}$$

ICP Method

The elemental analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was further diluted with DI water up to the final volume, V, and left to stabilize for two hours. The analysis was run at room temperature using a Thermo Elemental iCAP 6300 Inductively Coupled Plasma-Optical Emmision Spectrometer (ICP-OES) which was calibrated using a blank (a solution of 5% $HNO_3$), and standards of 0.5 ppm, 1 ppm, 10 ppm, 50 ppm, 100 ppm and 300 ppm of Al, Mg and Ti in solutions of 5% $HNO_3$.

Immediately before analysis the calibration is 'resloped' using the blank and 100 ppm standard, a quality control sample (20 ppm Al, Mg and Ti in a solution of 5% $HNO_3$, 3% HF in DI water) is run to confirm the reslope. The QC sample is also run after every 5$^{th}$ sample and at the end of a scheduled analysis set.

The content of Mg was monitored using the 285.213 nm line and the content for Ti using 336.121 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

Dielectric Analysis (DEA) is measured on a DEA 2070 of TA-Instruments with a gold coated sputter. The measurement was conducted at a ramp of 3° C./min to 130° C. at 50 Hz and a constant spring force (F) of 100 N.

The dielectric analysis measures the two fundamental electrical characteristics of material, i.e. capacitance and conductance, as functions of time, temperature and frequency. The capacitance of a material is the ability to store electric charge and the conductance of a material is the ability to conduct electric charge. Capacitance and conductance are important properties. Dissipation is not dependent on thickness, nor on orientation degree of the film. The properties determined by dielectric analysis are:

e'=permittivity
e''=loss factor
tan δ=dissipation factor (e''/e')
σ=ionic conductivity [1/Ωcm]

The conductance is proportional to the permittivity and the ionic conductivity is derived from the loss factor. Permittivity and loss factor both provide valuable information about molecular motion. The permittivity determines the alignment of dipoles and the loss factor corresponds to the energy required to align dipoles and move ions. The permittivity is low for polymers at low temperature because the dipoles can't move to align themselves with the electric field. Ionic conduction is not significant until the polymer turns fluid, i.e. above the glass transition temperature ($T_g$) and the melting temperature ($T_m$).

Above the glass transition temperature the loss factor is used to calculate the bulk ionic conductivity, using the equation:

$$\sigma = e'' \omega e_{10}$$

σ=ionic conductivity
ω=angular frequency (2πf)
f=frequency (Hz)
$e_{10}$=absolute permittivity of free space (8.85×10−12 F/m)

B. Examples

Catalyst Preparation—IE1

Solid Catalyst system used in the present invention was prepared according to example 8 of WO2004/029112, except that diethylaluminium chloride was used as an aluminium compound instead of triethyl aluminium. Catalyst contained 3.4 wt.-% of Ti, 12.8 wt.-% of Mg and 53 wt-% of Cl.

Polymerisation—IE1

Polymer was produced in prepolymerisation reactor of 50 m³, one slurry loop reactor of 150 m³ and one gas phase reactor with the process parameters according to Table 1. The solid catalyst system was as described in Catalyst preparation—IE1. As co-catalyst triethylaluminium (TEA) was used and as external donor dicyclopentyldimethoxysilane was used. Polymerisation data is enclosed in Table 1.

TABLE 1

| Parameter | Unit | IE1 |
|---|---|---|
| Prepolymerisation | | |
| Temperature | [° C.] | 30 |
| Pressure | [kPa] | 5300 |
| Al/donor ratio | [mol/mol] | 5 |
| Residence time | [h] | 0.31 |
| Catalyst feed | [g/h] | 4.9 |
| Loop | | |
| Temperature | [° C.] | 80 |
| Pressure | [kPa] | 5400 |
| Residence time | [h] | 0.8 |
| H2/C3 ratio | [mol/kmol] | 0.1 |
| MFR2 | [g/10 min] | 0.5 |
| XCS | [wt %] | 2.8 |
| GPR 1 | | |
| Temperature | [° C.] | 80 |
| Pressure | [kPa] | 2300 |
| Residence time | [h] | 1.1 |
| H2/C3 ratio | [mol/kmol] | 54 |
| XCS/pellet | [wt %] | 1.5 |
| MFR$_2$/pellet | [g/10 min] | 3.4 |
| Split loop/GPR | [wt %] | 40/60 |

Comparative Example—CE1

CE1 is commercially available very high purity "Borclean HB311BF" propylene homopolymer grade of Borealis AG for dielectric applications, which has MFR$_2$ (230° C.) of 2.2 g/10 min, T$_{in}$ (DSC, ISO 3146) of 161 to 165° C., very low ash content 10-20 ppm (measured by ISO 3451-1) and has been produced by a TiCl$_3$ based Ziegler-Natta catalyst. The commercial product has been further purified after the polymerization to reduce the catalyst residues.

Film Preparation (for Polymers IE1 and CE1)

Films of 7.0 μm were prepared by extrusion at a temperature of 215 to 240° C. and pressure of 40 bar. After cooling the machine direction orientation at a temperature of 140° C. was performed, followed by traverse direction orientation at a temperature of 160° C. Orientation ratios of 4.5×9.5 were chosen.

Polymer properties of IE1 and CE1 are disclosed in Table 2, and measured film properties in Table 3.

TABLE 2

| Polymer Properties | | | |
|---|---|---|---|
| | | CE 1 | IE 1 |
| MFR$_2$ | [g/10 min] | 2.3 | 3.4 |
| Tm | [° C.] | 161 | 161 |
| Tc | [° C.] | 112 | 111 |
| Mw | [g/mol] | 227000 | 218000 |
| MWD | [—] | 4.0 | 3.9 |
| <2,1> e | [mol-%] | 0 | 0 |
| Tensile modulus | [MPa] | 1788 | 1774 |
| Ash content | [ppm] | <20 | 60 |
| Washed | [—] | yes | no |

<2,1> e 2,1 erythro regio defects

TABLE 3

| Film properties | | | |
|---|---|---|---|
| | | CE 1 | IE 1 |
| Thickness | [μm] | 7.0 | 7.0 |
| Electrical property | | | |
| Amount of weak points | [200 V/μm-#/m$^2$] | 0.04 | 0 |
| | [250 V/μm-#/m$^2$] | 0.07 | 0.09 |
| | [300 V/μm-#/m$^2$] | 0.27 | 0.13 |
| | [350 V/μm-#/m$^2$] | 0.6 | 0.32 |
| | [400 V/μm-#/m$^2$] | n.a. | 0.6 |
| FS | [VDC/μm] | 740 | 675 |

Field strength at break down 100° C., resistance, Tan δ at 80° C. and resistance and electrical conductivity have values generally accepted for polypropylene in capacitor films.

Catalyst Preparation—IE2

Solid Catalyst system as described in Catalyst preparation—IE1 is used.

Polymerisation—IE2

The polymer was produced on bench scale in a 5 liter reactor in a two step procedure with the process parameters outlined in Table 4 a) Bulk Polymerisation

The catalyst was mixed with half of the amount of TEAL and external donor (Do) (dicyclopentyldimethoxysilane). The second half of TEAL and donor was added to the reactor. After 10 minutes of contact between the catalyst, TEAL and donor the mixture was injected to the reactor. Hydrogen was added, followed by 1.4 kg of propylene and the temperature was increased to 80° C. during 18 minutes. After 30 minutes not reacted propylene was flashed out and the polymer was collected and MFR was analysed.

b) Bulk+Gas Polymerisation

The bulk step in this test was done as described in a). After having flashed out not reacted propylene after the bulk step the reaction was continued in the gas phase by feeding 6 mol of hydrogen and required amount of propylene to reach the pressure 20 bar. The pressure was maintained at 20 bar by feeding propylene according to consumption. When the targeted split, as indicated by propylene consumption, was reached the reaction was stopped by flashing out not reacted propylene. The polymer was collected and analysed and tested. Polymerisation data is disclosed in Table 4.

TABLE 4

| Preparation | | |
|---|---|---|
| Parameter | Unit | IE2 |
| Catalyst | [mg] | 42.3 |
| Al/Ti | [mol/mol] | 100 |
| TEA | [μL] | 410 |
| Al/Do | [mol/mol] | 10 |
| Do | [μL] | 60 |
| Bulk | | |
| Temperature | [° C.] | 80° C. |
| Residence time | [h] | 0.5 |
| Yield | [g] | 390 |
| H2 | [mmol] | 6 |
| MFR | [g/10 min] | 0.7 |
| GPR | | |
| Temperature | [° C.] | 80° C. |
| Pressure | [kPa] | 2000 |
| Residence time | [h] | 0.8 |

TABLE 4-continued

Preparation

| Parameter | Unit | IE2 |
|---|---|---|
| Yield | [g] | 809 |
| Split bulk/GPR | [wt.-%] | 52/48 |

Comparative Example—CE2

CE2 is commercially available very high purity "Borclean HC318BF" propylene homopolymer grade of Borealis AG for dielectric applications, which has MFR$_2$ (230° C.) of 3.2 g/10 min, T$_m$ (DSC, ISO 3146) of 161° C., ash content below 20 ppm (measured by ISO 3451-1) and has been produced by a TiCl$_3$ based Ziegler-Natta catalyst. The commercial product has been further purified after the polymerization to reduce the catalyst residues. Polymer properties of polymers of IE2 and CE2 are disclosed in Table 5.

TABLE 5

Properties of the polymer

|  |  | CE 2 | IE 2 |
|---|---|---|---|
| MFR$_2$ | [g/10 min] | 3.2 | 3.1 |
| Tm | [° C.] | 161 | 161.5 |
| Tc | [° C.] | nm | 116.5 |
| XCS | [wt.-%] | nm | 1.6 |
| Ash | [ppm] | <20 | 220 |
| Washed | — | yes | no | nm—not measured

Film Preparation for Polymers of IE2 and CE2

Films of 24-29 μm were prepared by extrusion (Brabender Extrusiograph, screw 4:1 and mixer, torque 55 Nm, and 60 rpm) at temperature of 230 to 235° C. and pressure 400 bar.

After cooling and drying the granules (2h at 70° C.) orientation was performed using Brückner Karo IV stretcher. Machine direction orientation was followed by traverse direction orientation at orientation ratio 5×5 at a temperature of 160° C.

DEA (permittivity e', loss factor e" and Tan Delta) measurements were made using the films as prepared above.

In Table 6 results of permittivity e' (P), loss factor e" (L) and Tan Delta (D) values at 50 Hz and at temperatures about 75, 110° C. and 120° C. (P75, P110, P120, L75, L110, L120, D75, D110 and D120 respectively) are given.

Figure 2:
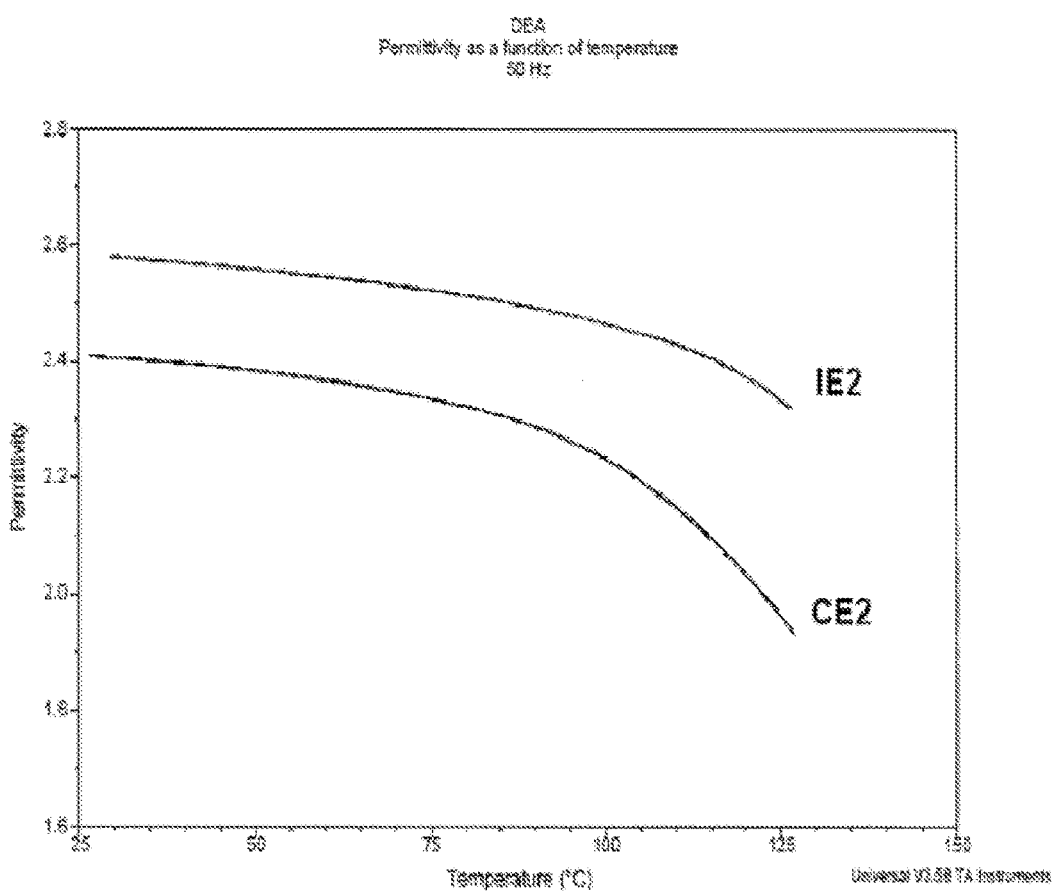

Curves based on the results are disclosed on FIGS. 1 and 2.

The ratios I-IV are calculated based on measured results:

$$\frac{(P75 - P110)}{P75} \times 100 \leq 6.0; \qquad \text{I}$$

wherein
P75 is the permittivity measured at 50 Hz and 75° C.,
P110 is the permittivity measured at 50 Hz and 110° C.;

$$\frac{(P75 - P120)}{P75} \times 100 \leq 12.0; \qquad \text{II}$$

wherein
P75 is the permittivity measured at 50 Hz and 75° C.,
P120 is the permittivity measured at 50 Hz and 120° C.;

$$\frac{(D75 - D110)}{D75} \times 100 \geq -10.0 \qquad \text{III}$$

wherein
D75 is the dissipation (tan delta) measured at 50 Hz and 75° C.,
D110 is the dissipation (tan delta) measured at 50 Hz and 110° C.;

$$\frac{(D75 - D120)}{D75} \times 100 \geq 10.0 \qquad \text{IV}$$

wherein
D75 is the dissipation (tan delta) measured at 50 Hz and 75° C.;
D120 is the dissipation (tan delta) measured at 50 Hz and 120° C.

TABLE 6

Permittivity, Loss factor and Tan Delta measurements at 50 Hz and temperatures about 75, 110 and 120° C.

|  | IE2 | CE2 |
|---|---|---|
| P75 | 2.526* | 2.366# |
| P110 | 2.435** | 2.173## |
| P120 | 2.381*** | 2.053### |
| L75 | 0.003737* | 0.00978# |
| L110 | 0.003359** | 0.01329## |
| L120 | 0.002755*** | 0.01173### |
| D75 | 0.00148* | 0.004134# |
| D110 | 0.001379** | 0.006115## |
| D120 | 0.001157*** | 0.005716### |
| I | 3.57 | 8.16 |
| II | 5.56 | 13.23 |
| III | 7.43 | -47.92 |
| IV | 21.82 | -38.27 |

Accurate measurement temperatures/° C.
*74.21
**108.89
***119.31
74.8
109.48
119.9

As can be taken from the measuring results of table 6 and the FIGS. 1 and 2, the permittivity and dissipation of the inventive example is less effected by the temperature than the comparative example.

The invention claimed is:
1. Process for producing a capacitor film comprising the steps of:
    (a) polymerizing propylene and optionally ethylene and/or at least one C$_4$ to C10 α-olefin in the presence of a catalyst comprising a solid catalyst system (SCS) to obtain a polypropylene (PP),
    (b) subjecting said polypropylene (PP) to a film forming process to obtain a capacitor film, wherein said polypropylene (PP) is the only polymer in the capacitor film,
    wherein during the polymerization step (a) said catalyst comprising the solid catalyst system (SCS) fragments into nanosized catalyst fragments (F) being distributed in said polypropylene (PP), said solid catalyst system (SCS) comprises:

(i) a compound of a transition metal of the periodic table (IUPAC),
(ii) a compound of a metal selected from one of the groups 1 to 3 of the periodic table (IUPAC), and
(iii) an electron donor (E), and wherein the polypropylene is not subjected to a washing step and wherein the solid catalyst system (SCS) is obtained by:
(a) preparing a solution of a complex (C) of a metal which is selected from one of the groups 1 to 3 of the periodic table (IUPAC) and an electron donor (E), said complex (C) is obtained by reacting a compound (CM) of said metal with said electron donor (E) or a precursor (EP) thereof in an organic solvent,
(b) mixing said solution of complex (C) with a liquid transition metal compound (CT),
(c) obtaining thereby an emulsion of a continuous phase and an dispersed phase, said dispersed phase is in form of droplets and comprises the complex (C) and the transition metal compound (CT), and
(d) solidifying the droplets of the dispersed phase obtaining thereby the solid catalyst system (SCS).

2. Process according to claim 1, wherein the polypropylene (PP):
(a) has <2,1> erythro regiodefects of equal or below 0.4 mol.-% determined by $^{13}$C-NMR spectroscopy, and/or
(b) has a breakdown voltage at 100° C. of at least 350 AC/μm measured on a biaxially oriented polypropylene (BOPP) film made from said polypropylene (PP) at a draw ratio in machine direction and in transverse direction of 4.5×9.5, and/or
(c) fulfils the equation $$\frac{(P75 - P110)}{P75} \times 100 \leq 6.0;$$

wherein
P75 is the permittivity measured at 50 Hz and 75° C.,
P110 is the permittivity measured at 50 Hz and 110° C.; and/or
(d) fulfils the equation $$\frac{(P75 - P120)}{P75} \times 100 \leq 12.0;$$

wherein
P75 is the permittivity measured at 50 Hz and 75° C.,
P120 is the permittivity measured at 50 Hz and 120° C.; and/or (e) fulfils the equation $$\frac{(D75 - D110)}{D75} \times 100 \geq -10.0,$$

wherein
D75 is the dissipation (tan delta) measured at 50 Hz and 75' C,
D110 is the dissipation (tan delta) measured at 50 Hz and 110° C.; and/or
(f) fulfils the equation $$\frac{(D75 - D120)}{D75} \times 100 \geq 10.0,$$

wherein
D75 is the dissipation (tan delta) measured at 50 Hz and 75° C.;
D120 is the dissipation (tan delta) measured at 50 Hz and 120° C.

3. Process according to claim 1, wherein the solid catalyst system (SCS)
(a) has a specific surface area measured according to ASTM D 3663 of less than 20 m$^2$/g, and/or
(b) comprises catalytically inactive solid material, wherein said material optionally has
(b1) a specific surface area below 500 m$^2$/g, and/or
(b2) a mean particle size (d50) below 200 nm.

4. Process according to claim 1, wherein the polypropylene (PP) is:
(i) a propylene homopolymer, or
(ii) a random propylene copolymer with a comonomer content of equal or below 1.0 wt. %, the comonomers are ethylene and/or at least one $C_4$ to $C_{10}$ α-olefin.

5. Process according to claim 1, wherein the film forming process is a drawing process in which the polypropylene (PP) is drawn in machine direction and in transverse direction, wherein the draw ratio in both directions is at least 4.0.

6. Process according to claim 1, wherein:
(a) a surfactant is used to form and/or stabilize the emulsion, and/or
(b) the temperature during formation of the emulsion is equal or below 60° C.

7. Process according to claim 1, wherein after film forming the obtained capacitor film is metalized.

* * * * *